United States Patent
Brener et al.

(10) Patent No.: US 8,804,606 B2
(45) Date of Patent: Aug. 12, 2014

(54) TRANSPARENT MESH OVERLAY IN HUB-SPOKE SATELLITE NETWORKS

(75) Inventors: Snir Brener, Petah Tikva (IL); Eran Haccoon, Petah Tikva (IL); Haim Halfon, Petah Tikva (IL); Guy Levitas, Tel Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 991 days.

(21) Appl. No.: 12/538,242

(22) Filed: Aug. 10, 2009

(65) Prior Publication Data

US 2010/0034136 A1    Feb. 11, 2010

Related U.S. Application Data

(60) Provisional application No. 61/087,827, filed on Aug. 11, 2008.

(51) Int. Cl.
| | |
|---|---|
| H04B 7/212 | (2006.01) |
| H04N 21/242 | (2011.01) |
| H04N 21/43 | (2011.01) |
| H04J 3/06 | (2006.01) |
| H04L 7/00 | (2006.01) |

(52) U.S. Cl.
CPC .......... *H04N 21/242* (2013.01); *H04N 21/4305* (2013.01); *H04J 3/0644* (2013.01); *H04L 7/0008* (2013.01)
USPC ........... 370/321; 370/350; 370/516; 370/508; 370/509; 375/240.28; 348/460; 348/425.4; 348/725; 709/231; 709/234; 709/219; 709/245

(58) Field of Classification Search
None
See application file for complete search history.

(56) References Cited

U.S. PATENT DOCUMENTS

| | | | |
|---|---|---|---|
| 3,562,432 A * | 2/1971 | Gabbard | 370/324 |
| 4,583,208 A * | 4/1986 | Verboom | 369/30.14 |
| 4,688,248 A * | 8/1987 | Tomizawa | 380/211 |
| 5,663,954 A * | 9/1997 | Hakkanen et al. | 370/278 |
| 5,675,654 A * | 10/1997 | Ryan | 380/227 |
| 6,429,902 B1 * | 8/2002 | Har-Chen et al. | 348/518 |
| 6,542,203 B1 * | 4/2003 | Shadwell et al. | 348/726 |
| 6,870,571 B1 * | 3/2005 | Narushima et al. | 348/552 |

(Continued)

FOREIGN PATENT DOCUMENTS

| | | |
|---|---|---|
| WO | 00/77656 A | 12/2000 |
| WO | 2005/027373 A | 3/2005 |

OTHER PUBLICATIONS

PCT/IB2009/006518, International Search Report, maildate Feb. 23, 2010.

(Continued)

*Primary Examiner* — Ian N Moore
*Assistant Examiner* — Dung B Huynh
(74) *Attorney, Agent, or Firm* — Banner & Witcoff, Ltd.

(57) ABSTRACT

In a satellite-based communication network comprised of a central hub and plurality of remote terminals configured to transmit data to and receive data from the central hub in accordance with EN 301 790 (DVB-RCS), and where one or more of these remote terminals may be configured to include an additional receiver module configured to receive MF-TDMA transmission of other remote terminals, a mesh receiver and methods for coupling the mesh receiver with the host remote terminal. In addition, described herein are methods for synchronizing the mesh receiver on the network's timing and frequency and for utilizing the available link power for achieving efficient connectivity.

19 Claims, 8 Drawing Sheets

(56) References Cited

U.S. PATENT DOCUMENTS

| | | | | |
|---|---|---|---|---|
| 6,914,637 | B1* | 7/2005 | Wolf et al. | 348/473 |
| 7,116,894 | B1* | 10/2006 | Chatterton | 386/211 |
| 7,215,652 | B1* | 5/2007 | Foley et al. | 370/319 |
| 7,263,648 | B2* | 8/2007 | Blackburn et al. | 714/763 |
| 7,388,937 | B1* | 6/2008 | Rodger et al. | 375/348 |
| 2002/0006202 | A1* | 1/2002 | Fruehauf et al. | 380/260 |
| 2002/0044094 | A1* | 4/2002 | May | 343/703 |
| 2002/0132631 | A1* | 9/2002 | Wesby et al. | 455/502 |
| 2003/0163821 | A1* | 8/2003 | Knutson et al. | 725/63 |
| 2003/0214977 | A1* | 11/2003 | Kuo | 370/503 |
| 2004/0136352 | A1* | 7/2004 | Fu et al. | 370/341 |
| 2004/0240477 | A1* | 12/2004 | Lanzone et al. | 370/503 |
| 2005/0058224 | A1 | 3/2005 | Alagha et al. | |
| 2005/0141565 | A1* | 6/2005 | Forest et al. | 370/503 |
| 2005/0262424 | A1* | 11/2005 | Tran et al. | 714/801 |
| 2006/0120403 | A1* | 6/2006 | Murata et al. | 370/468 |
| 2006/0126576 | A1* | 6/2006 | Dale et al. | 370/336 |
| 2007/0244656 | A1* | 10/2007 | Cranford et al. | 702/79 |
| 2008/0056025 | A1* | 3/2008 | Kanagawa et al. | 365/189.15 |
| 2008/0225898 | A1* | 9/2008 | DeLew et al. | 370/503 |
| 2009/0122852 | A1* | 5/2009 | Smith et al. | 375/228 |

OTHER PUBLICATIONS

Extended European Search Report—EP13153078.4—Mailing date: Apr. 4, 2013.

\* cited by examiner

TRANSPARENT MESH OVERLAY IN HUB-SPOKE SATELLITE NETWORKS

RELATED APPLICATIONS

The present application is a non-provisional of U.S. Provisional application Ser. No. 61/087,827, filed Aug. 11, 2008, entitled "Transparent Mesh Overlay In Hub-Spoke Satellite Networks," the contents of which are incorporated herein by reference in their entirety for all purposes.

TECHNICAL FIELD

This invention relates to the filed of satellite communication networks. More specifically, this invention relates to methods for realizing mesh connectivity overlay in a hub-spoke satellite communication network. In addition, this invention also relates to the Digital Video Broadcast Return Channel via Satellite standard (EN 301 790, also known as DVB-RCS).

BACKGROUND

The DVB-RCS standard (EN 301 790) defines a hub-spoke communication architecture for satellite communication systems. Under these definitions, any given remote terminal may communicate with an external network or with any other remote terminal via a central hub.

However, hub-spoke architecture is non-optimal for communication between remote terminals, especially if such communication makes up a substantial portion of the total traffic in the network. Mesh connectivity is much more suitable for communication between remote terminals. Mesh connectivity offers lower latency while being more efficient in terms of bandwidth usage.

The latest version of the DVB-RCS standard (EN 301 790 v1.5.1) includes references to mesh connectivity. The DVB-RCS standard recognizes two possible implementations, one based on regenerative satellites (i.e. with on-board processing for extracting the information from the MF-TDMA bursts and encapsulating it into a DVB-S or DVB-S2 TDM downlink signal) and one based on transparent satellites and on MF-TDMA receivers incorporated into the remote terminals.

In reference to the implementation over transparent satellites, while the DVB-RCS standard includes some provisioning for supporting mesh-capable terminals, it does not include any recommendations as to methods for realizing mesh connectivity.

The following applications may be considered as prior art in the field of which this invention relates to:

US2006/0126576 A1, Dale et al, Partial Mesh Communication in Hub Based System

This application describes in very general terms a method using which transparent mesh overlay can be implemented in a hub-spoke satellite network employing forward and return links according to EN 301 790 (DVB-RCS).

It is suggested that the system and the methods described herein are materially different than those described in the above-mentioned application. The differences can be found in many aspects, such as the architecture of the mesh receiver, the way it is interconnected with the host terminal, the way frequency offsets are compensated, the way power control is applied and more. Furthermore, the above-mentioned application does not teach any concrete method or embodiment for achieving the claimed functionality (except suggesting that such is possible), while the description included here-in teaches such methods.

U.S. Pat. No. 6,212,360, Fleming, III et al, Methods and Apparatus for Controlling Earth-Station Transmitted Power in a VSAT Network.

This application describes methods for controlling transmission power both over a forward link and over return channels.

It is suggested that the system and the methods described herein are materially different than those described in the above-mentioned application. The differences can be found in many aspects, the most important of them are the network topology and the algorithms used.

U.S. patent application Ser. No. 12/337,330 (based on provisional application 61/014,478), Ben Laish et al, Multi-Dimensional Adaptive Transmission Technique This application, also assigned to the applicant of this application, describes methods for providing transmission adaptability in satellite-based communication networks.

This application further suggests that transmission power control may be applicable to satellite communication networks where mesh connectivity is possible between remote terminals.

It is suggested that the above-described application merely cites that it is possible to have transmission power control methods existing in a satellite communication network with mesh connectivity facilities, but it does not teach any such methods in specifics. Therefore some aspects of this current invention may be viewed as a related to the above-mentioned application, the contents of which are incorporated herein by reference in their entirety for all purposes.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In aspects of the present invention, a satellite-based communication network may include a central hub and plurality of remote terminals (VSATs), all configured to transmit data to and receive data from the central hub in accordance with EN 301 790 (DVB-RCS). Furthermore, in addition to a TDM receiver as per EN 301 790, some of these remote terminals may be equipped also with an additional receiver module, also referred to herein as a mesh receiver. Such mesh receiver may be configured to receive MF-TDMA transmission of other remote terminals.

Aspects of this invention include the mesh receiver, comprising at least two reception channels for at least the purpose of supporting fast frequency hopping. Each of these reception channels may be further comprised of a configurable tuner. The mesh receiver may further include a transport stream demultiplexer for at least the purpose of enabling autonomous extraction of relevant allocations, a dedicated processor for at least the purpose of combining received ATM cells or MPEG frames into messages and an Ethernet interface for at least the purpose of transmitting received messages to a host terminal. Further embodiments of this invention may also include coupling of the mesh receiver with the antenna in parallel with the TDM receiver of the host terminal.

In additional aspects of the invention, methods may be used by a host remote terminal and a mesh receiver for synchronizing the mesh receiver to the network timing. These methods include at least a method for timing synchronization acquisition and a method for detecting loss of timing synchronization.

In further aspects of this invention, the satellite-based communication system may use methods for synchronizing the tuners of a mesh receiver to the transmission frequencies of other remote terminals. These methods include at least an initial frequency synchronization method, a frequency tracking method and a frequency resynchronization method.

In still further aspects of the invention, the satellite-based communication system may use methods for dynamically determining the difference in link conditions between the hub down-link and the down-link of each remote terminal equipped with a mesh receiver. These methods include at least an initial link difference measurement method, and a recalibration method. By determining this deference in real time, the system may be configured to support multi-dimensional adaptive transmissions over mesh connectivity as well as towards the hub.

BRIEF DESCRIPTION OF THE DRAWINGS

Figure 1:
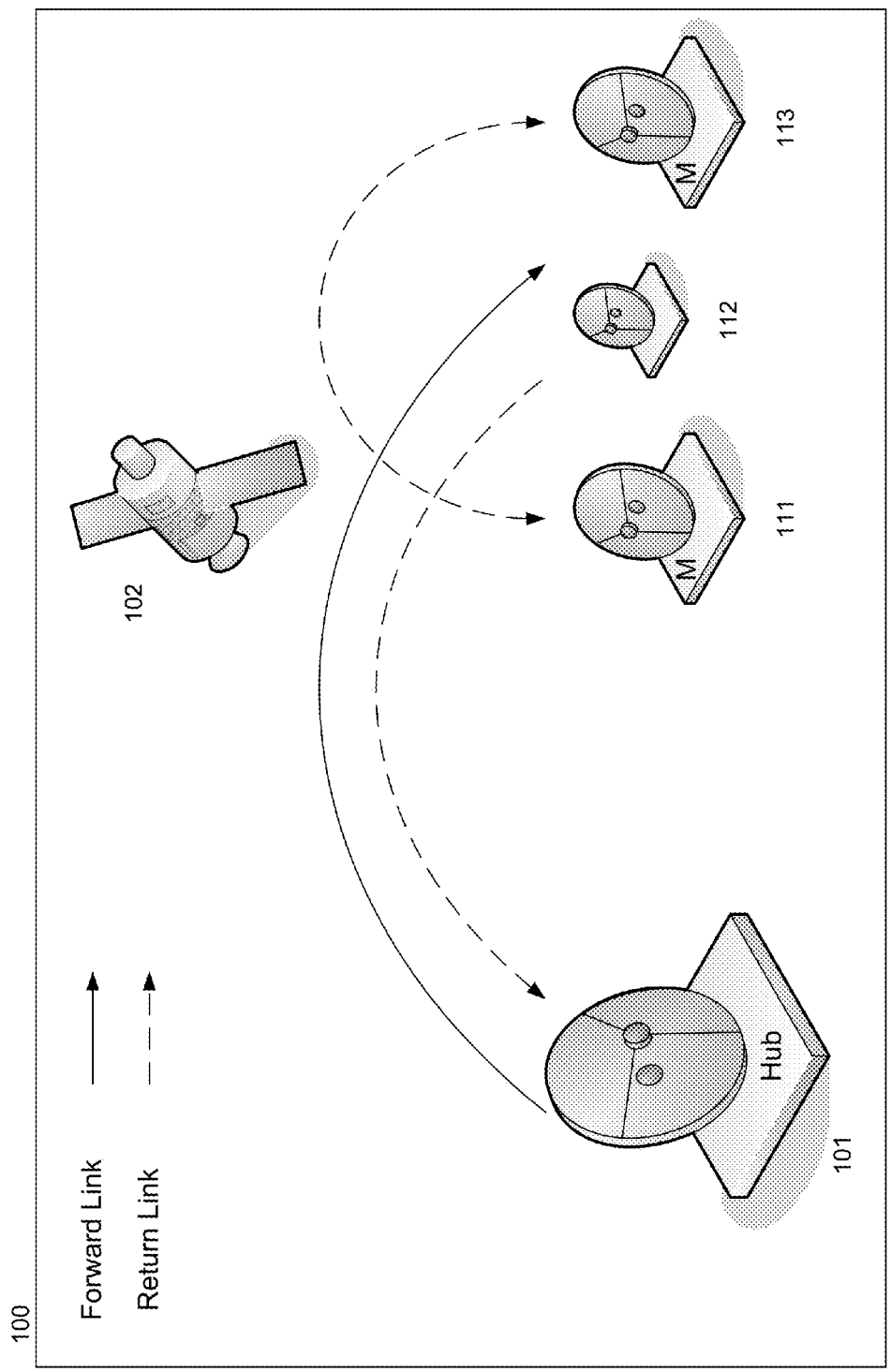

Having thus described the invention in general terms, reference will now be made to the accompanying drawings, which are not necessarily drawn to scale, and wherein:

FIG. 1 shows a satellite communication network in accordance with aspects of this invention.

Figure 2:
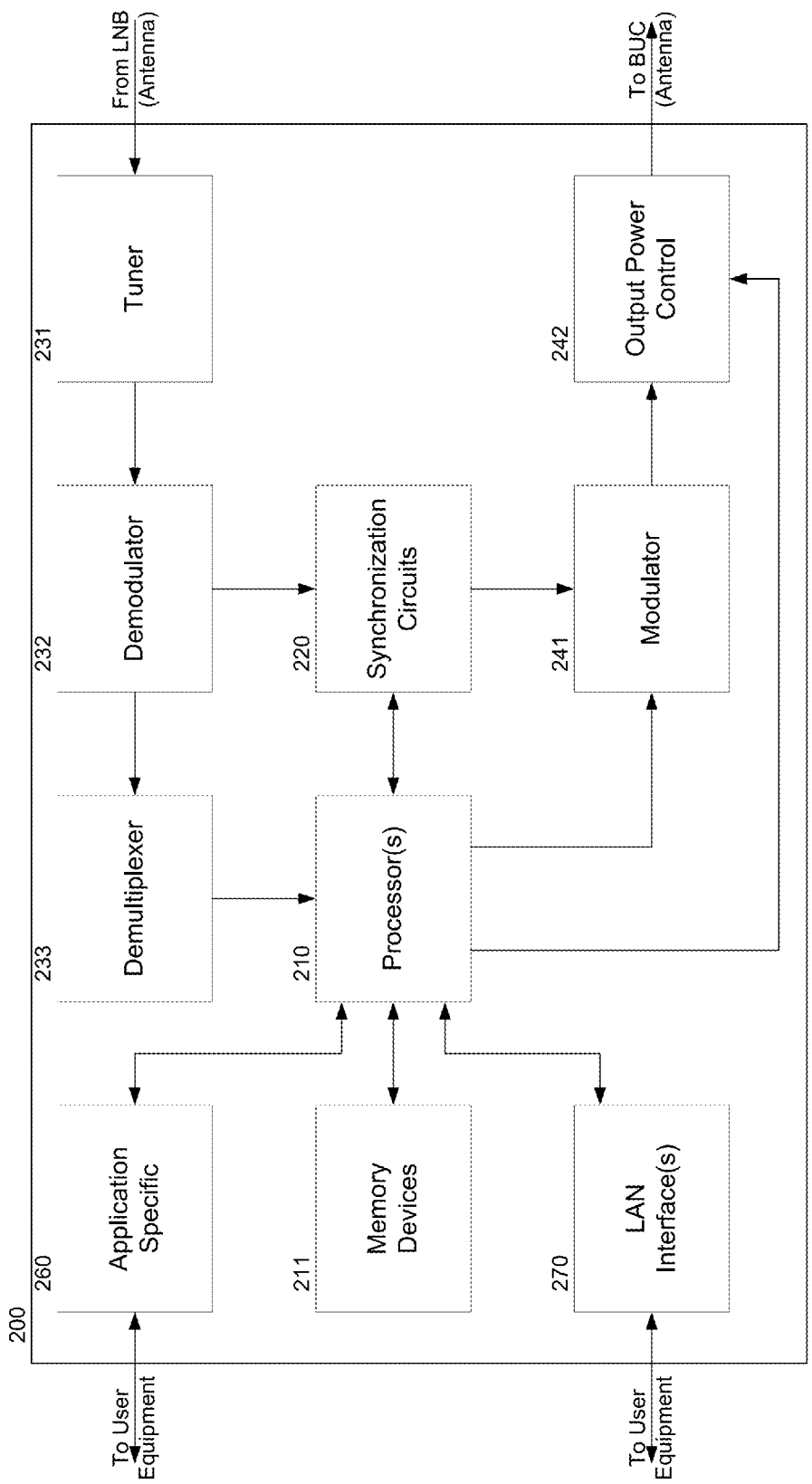

FIG. 2 shows a block diagram of a remote terminal in accordance with aspects of this invention.

Figure 3:
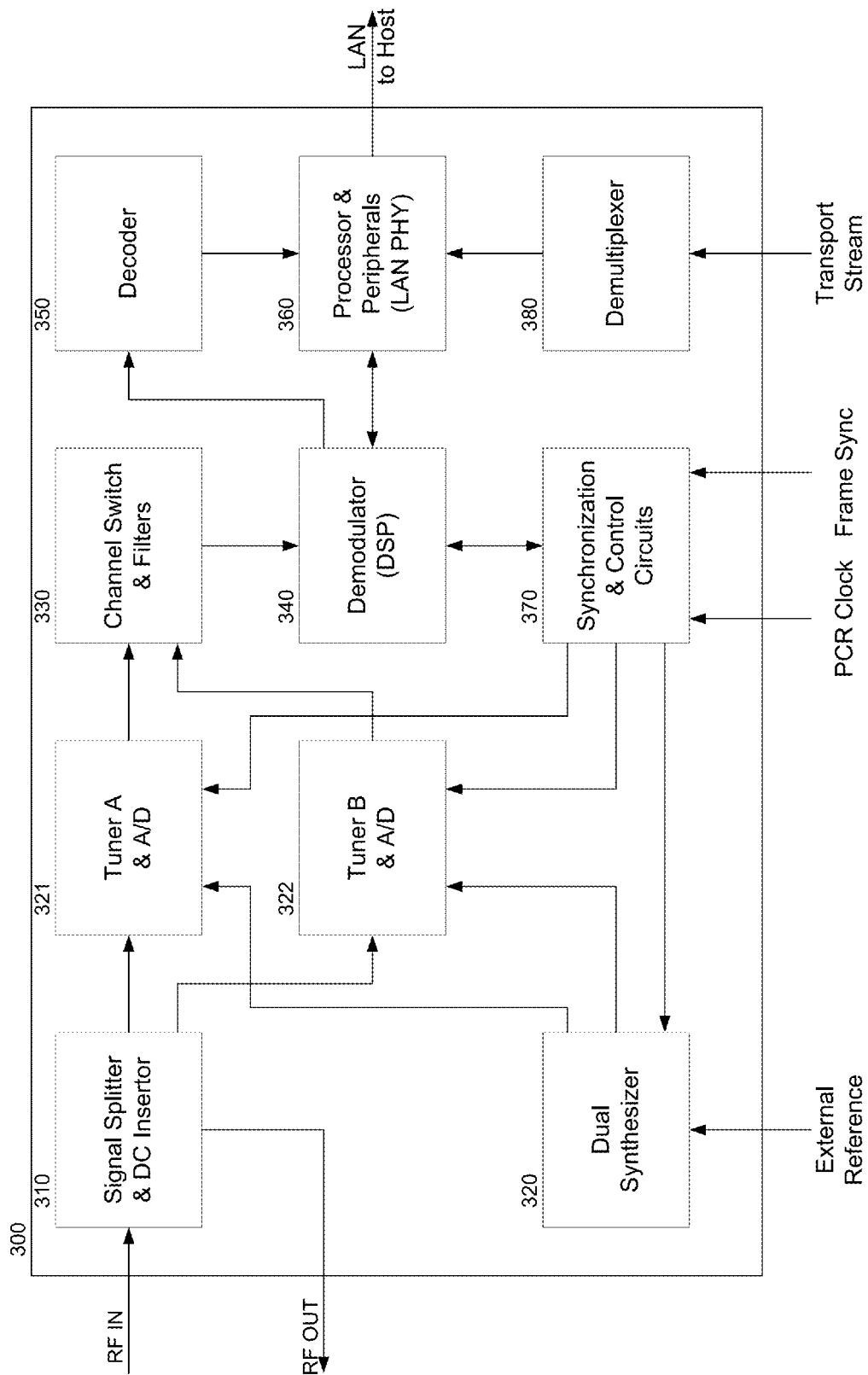

FIG. 3 shows a block diagram of a mesh receiver in accordance with aspects of this invention.

Figure 4:
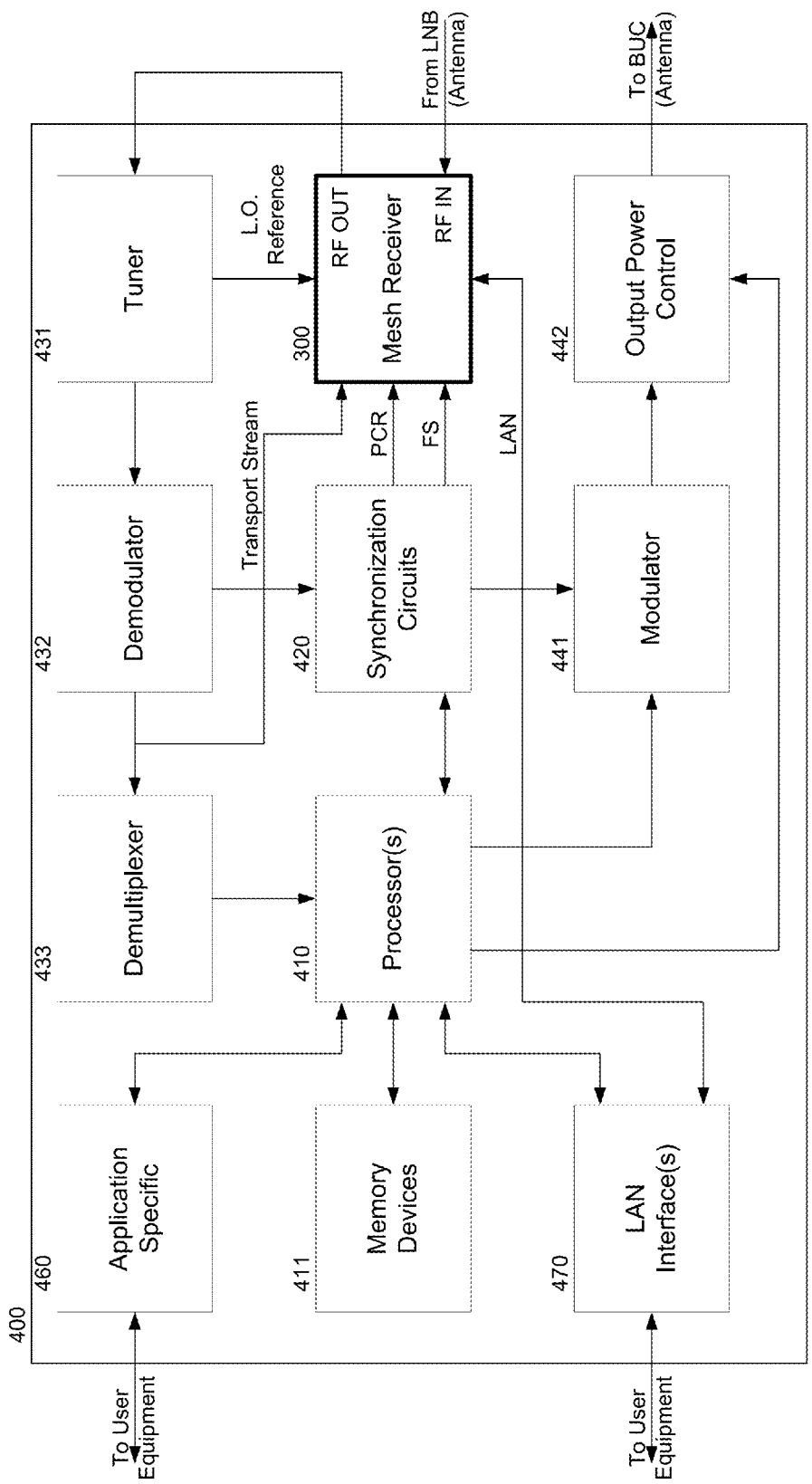

FIG. 4 shows a block diagram of a remote terminal containing a mesh receiver in accordance with aspects of this invention. In addition, this figure also shows coupling of the mesh receiver to an antenna in parallel to the TDM receiver of the host terminal according to aspects of this invention.

Figure 5:
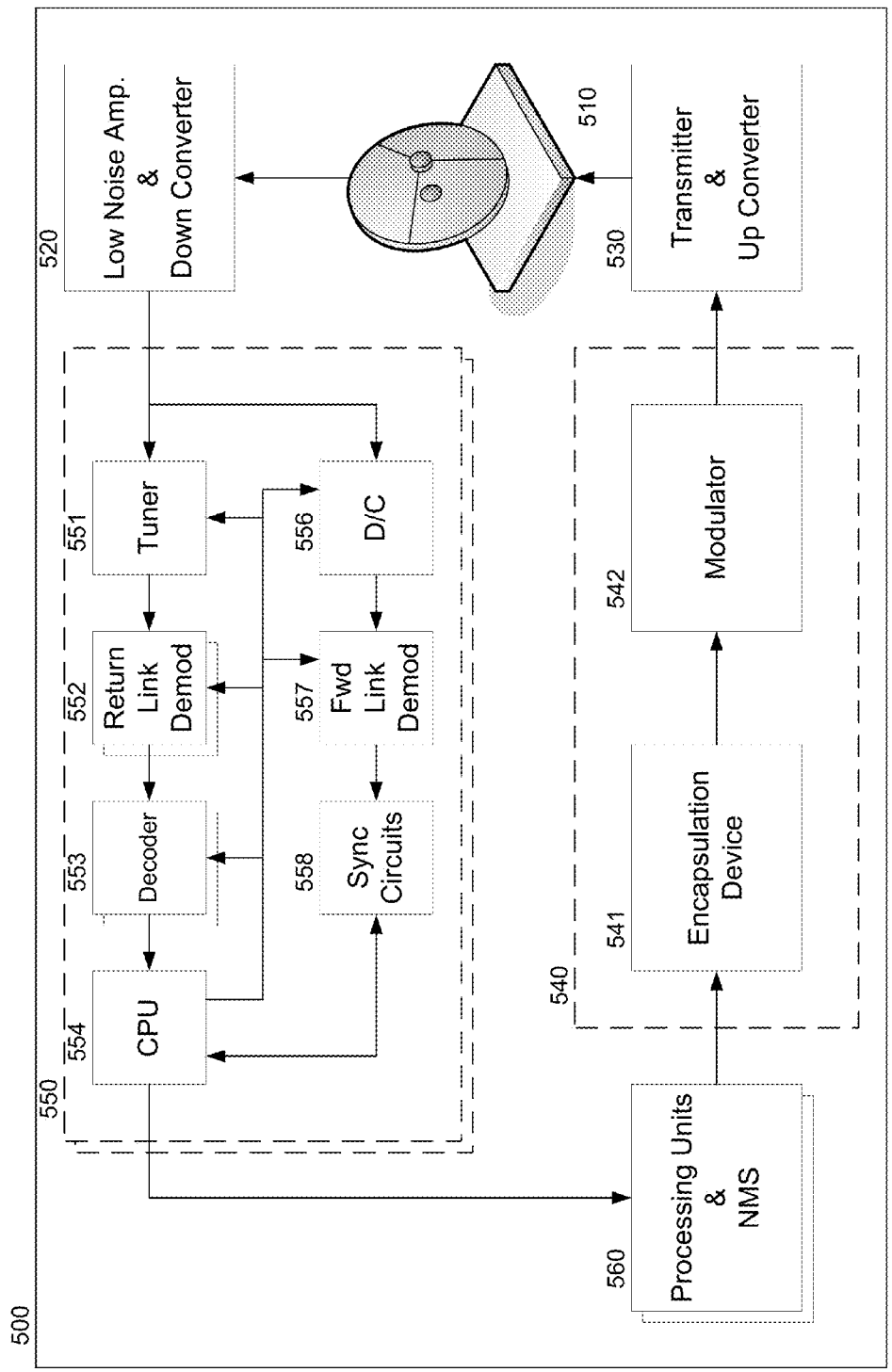

FIG. 5 shows a block diagram of a hub in accordance with the aspects of this invention.

Figure 6:
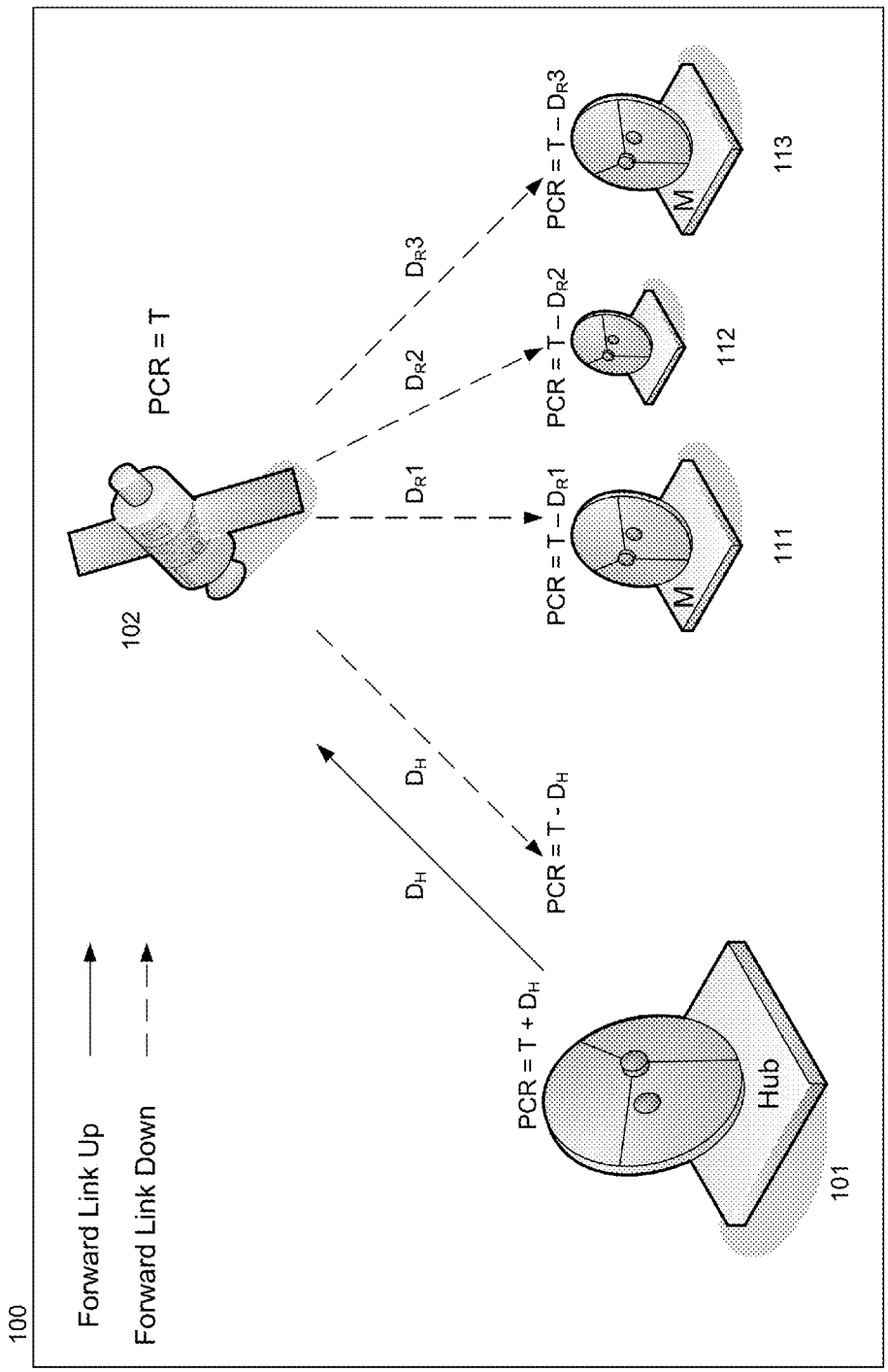

FIG. 6 shows an embodiment of the timing scheme of a satellite communication system in accordance with aspects of this invention.

Figure 7:
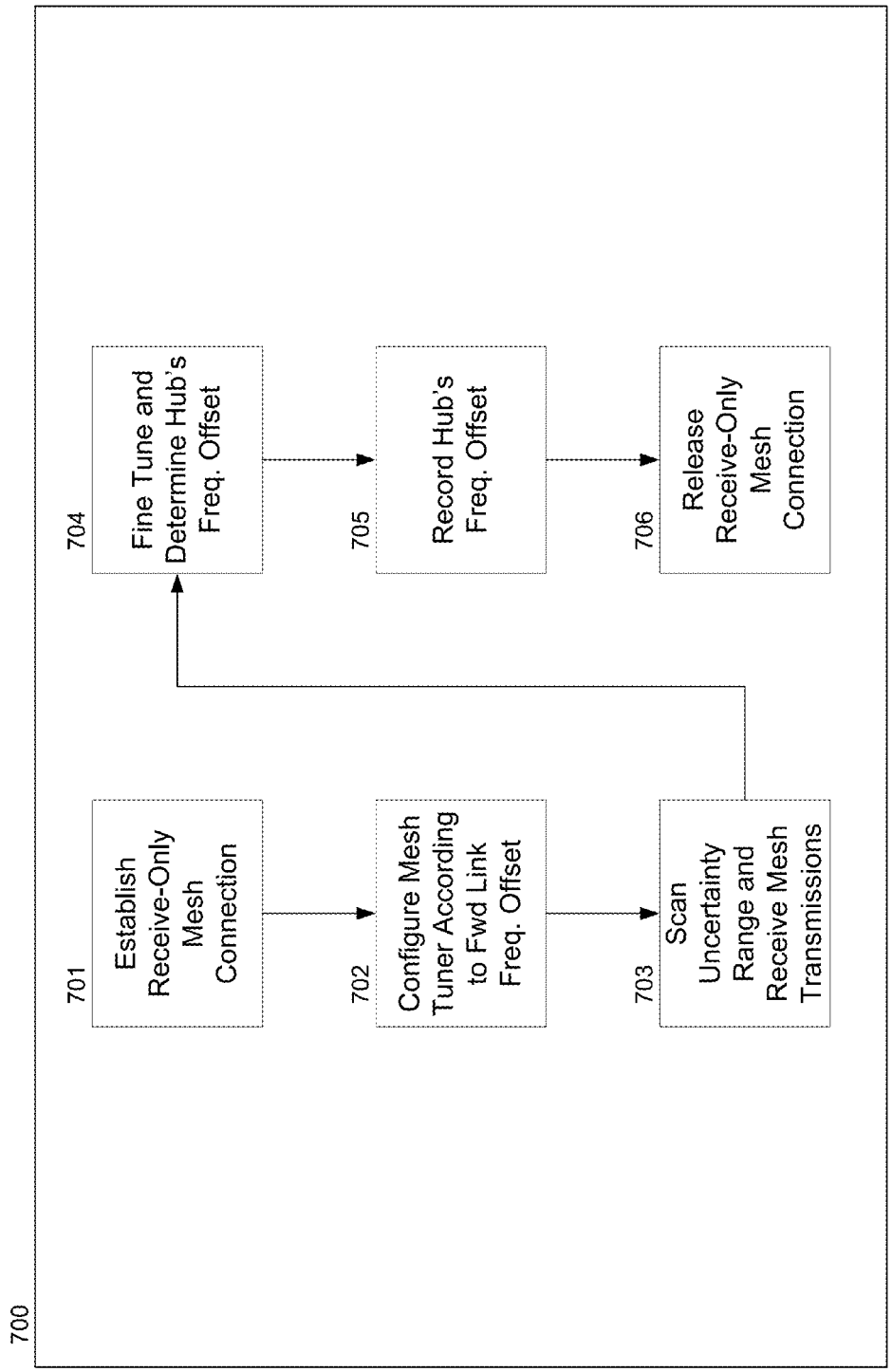

FIG. 7 shows a flow chart describing an initial frequency synchronization algorithm in accordance with aspects of this invention.

Figure 8:
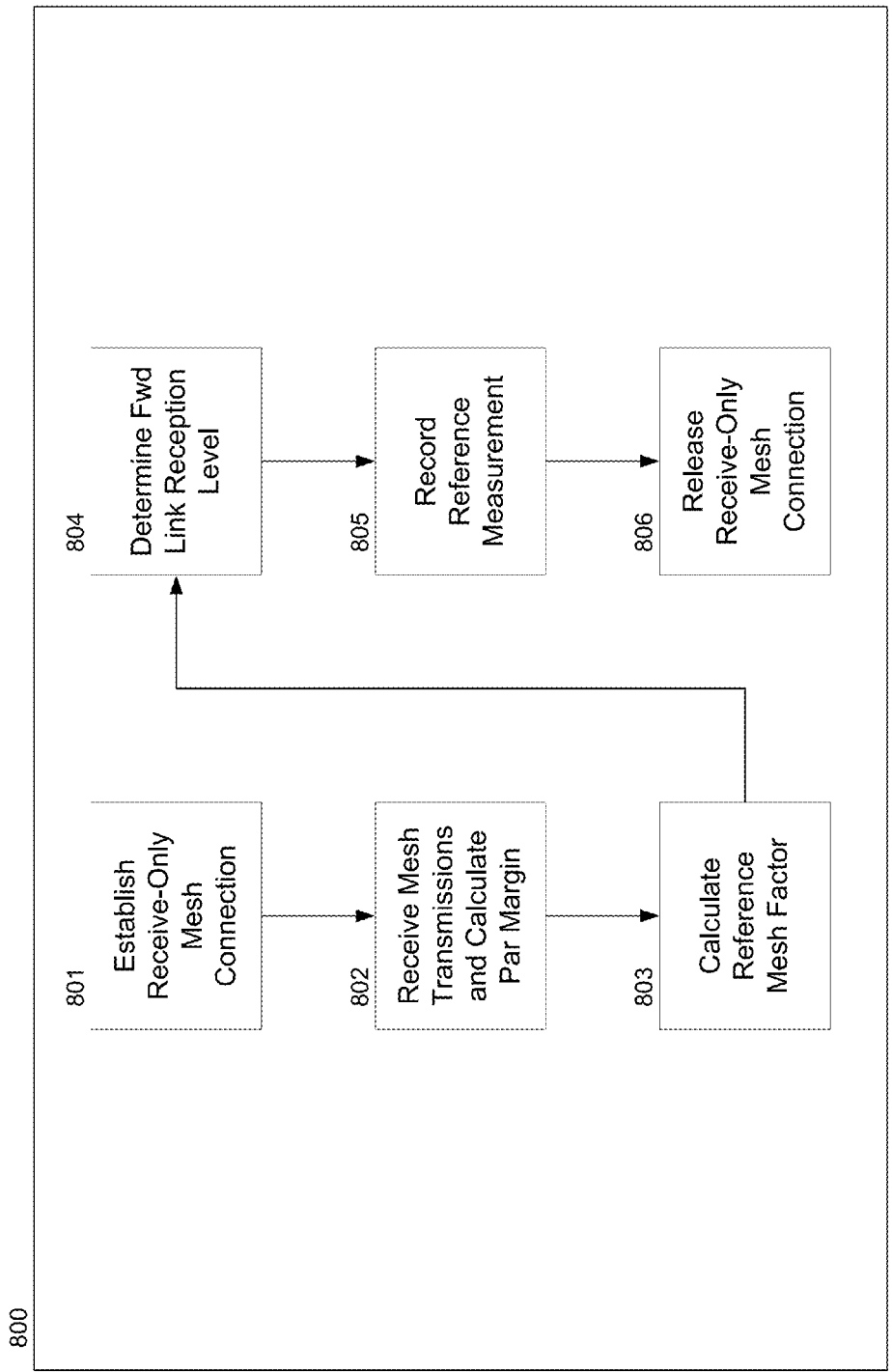

FIG. 8 shows a flow chart describing a mesh factor calibration algorithm in accordance with aspects of this invention.

DETAILED DESCRIPTION

FIG. 1 shows a satellite-based communication network 100 comprised of a central hub 101 and plurality of remote terminals (VSATs) 111 to 113. Hub 101 and remote terminals 111 to 113 may be configured to transmit data and receive data via satellite 102 in accordance with EN 301 790 (DVB-RCS). In some preferred embodiments of this invention, the forward link may be configured in accordance with EN 300 421 (DVB-S) or in accordance with EN 302 307 (DVB-S2) and the return link may be configured in accordance with EN 301 790.

Furthermore, in addition to a TDM receiver configured to receive the forward link, remote terminals 111 and 113 may be configured to include an additional MF-TDMA receiver module, also referred to herein as a mesh receiver. A mesh receiver may be configured to receive transmissions of other remote terminals where such transmission are in accordance with EN 301 790. If so configured, remote terminals 111 and 113 may exchange information via satellite 102 without routing that information via the hub. Consequently, remote terminals 111 and 113 may achieve connectivity with shorter latency while utilizing minimal capacity, as the forward link capacity, that would have been required should the information been routed via the hub, is saved.

Furthermore, while remote terminals 111 and 113 may be configured to include a mesh receiver, other remote terminals, such as remote terminal 112, may remain in a traditional configuration, i.e. not including a mesh receiver, and continue to provide service as part of satellite-based communication network 100. Like in a regular star-topology network, any traffic to remote terminal 112 is routed via the hub including any such traffic originated from remotes 111 and 113. In some embodiments of this invention, information originated from remote terminal 112 and destined to remote terminals such as 111 and 113 may be routed directly over the satellite to the receiving remote terminal, while any returning information is routed via the hub. Such embodiments allow reducing latency and bandwidth utilization for inter-terminal communication even if only some of the terminals are configured to include a mesh receiver while other terminals are not so configured.

FIG. 2 shows an exemplary block diagram of a remote terminal such as remote terminal 112 of FIG. 1. A remote terminal may be configured to include an antenna (not shown), a low-noise block amplifier (LNB) that may be mounted on the antenna (not shown), a satellite transmitter (also sometimes referred to as block up converter (BUC)) that may be mounted on the antenna (not shown), and an indoor unit 200, which may be coupled to the antenna, and/or to the other components that may be mounted on the antenna, via appropriate cables.

Indoor unit 200 may further include a TDM receiver comprised of tuner 231, demodulator 232 and demultiplexer 233, a transmission channel comprised of modulator 241 and output power control hardware 242 (e.g. attenuators), synchronization circuits 220, one or more processors 210 coupled with volatile and/or non-volatile memory devices 211 and one or more LAN interfaces 270. It should be appreciated by anyone skilled in the art that various signals exchanged between the various blocks described in FIG. 2 cannot be shown in details at such an abstraction level.

Tuner 231 may be configured to tune on the forward-link signal. Tuner 231 may also include a frequency down converter, which may be configured to provide the forward channel signal to demodulator 232 at either IF, near base-band or base-band frequencies rather than at higher frequency bands often used at outputs of LNB units.

Demodulator 232 may be configured to demodulate and decode the forward link signal as per the applicable modulation technique (e.g. DVB-S or DVB-S2). Demodulator 232 may also be configured to measure certain parameters of the received forward link signal, such as the frequency offset at which the forward link signal is received and the signal to noise ratio of the received signal, either in terms of C/N (carrier to noise) or $E_s/N_0$ (normalized symbol energy).

Furthermore, demodulator 232 may also be configured to output the demodulated transport stream, which may be comprised of a plurality of frames, such as but not limited to MPEG frames (as per DVB-S and DVB-S2), immediately following one another,. This transport stream may then be fed into demultiplexer 233.

Demultiplexer 233 may be configured to receive a transport stream comprised of a plurality of frames, such as but not limited to MPEG frames, immediately following one another and to inspect a header in each frame in order to determine whether a received frame is relevant for this remote terminal, i.e. destined at least to this remote terminal. Demultiplexer 233 may further be configured to discard non-relevant frames and forward relevant frames to processor 210.

Demodulator 232 may further be configured to extract frames containing clock timestamps, such as PCR timestamps defined by DVB-RCS, out of the transport stream and provide them on a separate interface. Such interface may be coupled to synchronization circuits 220 for at least the purposes of obtaining synchronization on the network's time base and reconstructing an accurate local clock at the rate of the original clock used for generating said timestamps. Where derived from PCR timestamps, said accurate clock is referred to as PCR clock.

Furthermore, based on the obtained synchronization on the network's time base and in some embodiments also on knowledge of the distance between the remote terminal and the satellite, synchronization circuits 220 may be configured to generate the necessary signals for timing the remote terminal's transmissions, so that such transmissions may arrive at the satellite (e.g. satellite 102 of FIG. 1) and then at the hub (e.g. hub 101 of FIG. 1) at their designated times as per the timeslots that the hub may allocate to the remote terminal.

Modulator 241 may be configured to receive information formatted for transmission according to the DVB-RCS standard and modulate it into transmission bursts according to the applicable frequency, symbol rate, modulation type and coding rate. Modulator 241 may further be configured to receive symbol rate, modulation type and coding rate information from processor 210 on a per burst basis and modulate each burst as per the requested frequency, symbol rate, modulation type and coding rate.

In order to facilitate transmission over a different channel at a time, modulator 241 may also be configured to include at least one configurable frequency synthesizer and at least one up converter. In some embodiments of this remote terminal, modulator 241 may include at least two configurable synthesizers in order to facilitate fast frequency hopping, i.e. allow the remote terminal to change transmission channels on every timeslot without requiring any gap between such timeslots except for guard intervals which may already exist between timeslots.

Before being transmitted toward the antenna, the modulated signal may be configured to pass via output power control circuits 242. These circuits may be configured to have different gain (attenuation) for each transmitted burst. Therefore, each burst may be transmitted at the lowest power level sufficient for achieving proper reception at the hub (e.g. hub 101 of FIG. 1). In some embodiments of satellite-based communication network 100 (of FIG. 1), the remote terminal may be configured to transmit at some margin above the lowest power level sufficient for achieving proper reception at the hub, for at least the purpose of (rain) fade mitigation.

Processor 210 may be configured to receive relevant frames from demultiplexer 233, process them according to applicable protocols, and send packets resulting from such processing to any user equipment, which may be connected to the remote terminal via any of the LAN interfaces 270 or via another interface, which may be available through application specific hardware (and software) 260 that may be integrated into indoor unit 200 as shown in FIG. 2. In some embodiments, application specific hardware (and software) 260 may be externally coupled with indoor unit 200 via any of the LAN interfaces 270. Furthermore, processor 210 may be also configured to receive packets from user equipment connected to the remote terminal as described above, process these packets according to applicable protocols, format packets resulting from such processing into transmission bursts and send said transmission bursts to modulator 241 for the purpose of transmitting them over the satellite (e.g. satellite 102 of FIG. 1) toward the hub (e.g. hub 101 of FIG. 1).

Application specific hardware (and software) 260 may be configured not only to provide a different interface to user equipment other than LAN but also to perform further processing of information received from and transmitted to processor 210, including converting it into a different format, such as but not limited to voice signals and/or video signals.

FIG. 3 shows a block diagram of a mesh receiver 300, which remote terminals 111 and 113 of FIG. 1 may be configured to include. Mesh receiver 300 may be comprised of signal splitter 310, dual synthesizer module 320, at least two configurable tuners 321 and 322, channel switch 330, demodulator 340, decoder 350, processor 360, synchronization and control circuits 370 and demultiplexer 380. It should be appreciated by anyone skilled in the art that various signals exchanged between the various blocks described in FIG. 3 cannot be shown in details at such an abstraction level.

Signal splitter 310 may be configured to receive a signal from an antenna or from an LNB mounted on an antenna via a first port, and to generate first and second copies of the input signal. Signal splitter 310 may further be configured to output said first copy of the input signal via a second port. Signal splitter 310 may yet further be configured to split said second copy of the input signal into a third and fourth copies of the input signal for the purpose of providing similar or identical input signals to tuners 321 and 322.

Furthermore, signal splitter 310 may be configured to pass through DC current and DC voltage at minimal loss from said second port to said first port for at least the purpose of powering an LNB, to which mesh receiver 300 may be coupled. In yet additional embodiments, signal splitter 310 may be configured to provide high isolation between said second port and tuners 321 and 322, which may be configured to receive said third and fourth copies of the input signal.

Dual synthesizer 320 may be configured to use two independent synthesizer circuits for at least the purpose of synthesizing two independent local oscillator signals, and to provide each such local oscillator signal to one of the tuners 321 and 322. Dual synthesizer 320 may further be configured to receive an external reference signal, e.g. at a frequency of 27 MHz, and to use said external reference signal as reference for both synthesizers at least for the purpose of having identical frequency offset ratios (or relative frequency errors, e.g. in PPM) for both local oscillator signals, which may be generated by said synthesizers. Furthermore, said local oscillator signals may be configured to have different frequencies or same frequency. In preferred embodiments, while one synthesizer is active and its output signal is used by one of the tuners 321 or 322, the other synthesizer may be configured to change its output signal's frequency in preparation for receiving a next burst.

Tuner 321 may be configured to receive a copy of the input signal from signal splitter 310, to receive a local oscillator signal from dual synthesizer 320, to extract (filter) a signal of interest from the input signal and to convert it to a digitally sampled signal. For the purpose of the analog to digital conversion, tuner 321 may be configured to receive a sample clock from synchronization and control circuits 370. Said sample clock may be configured to be of different rate on a per burst basis at least for the purpose of allowing mesh receiver 300 to dynamically receive signals of different symbol rates. As tuner 322 is identical to tuner 321, the above description is applicable to tuner 322 as well.

Channel switch 330 may be configured to receive the digital outputs of tuners 321 and 322, to select one of these outputs on a per burst basis and to pass the selected signal to demodulator 340. Channel switch 330 may further be configured to include decimation filters and/or FIR filters at least for the purpose of providing the output signal with a constant number of samples per symbol.

Demodulator 340 may be configured to receive information of expected bursts and their expected modulation types (such as QPSK, 8PSK or any other method which may be applicable), demodulate each received burst according to the expected modulation type, and forward the demodulated coded bits to decoder 350. In some embodiments, demodulator 340 may be implemented as software code running over a digital signal processor (DSP). In such embodiments, demodulator 340 may also be configured to control tuners 321 and 322, and dual synthesizer 320 via synchronization & control circuits 370. In further embodiments, demodulator 340 may be configured to provide certain measurements of received bursts, such as but not limited to frequency offset at which bursts are received and the signal to noise ratio of received signals, either in terms of C/N (carrier to noise) or $E_S/N_0$ (normalized symbol energy).

Decoder 350 may be configured to receive blocks of coded bits, to receive information of coding rate on a per block basis, to decode each block according to the applicable coding rate and to provide blocks of user bits to processor 360. These blocks may follow the formats of return channel bursts (as defined in EN 301 790) in general and the format of traffic (TRF) bursts in particular. In some embodiments, decoder 350 may be implemented in a programmable gate-array device (e.g. FPGA) together with other modules, such as synchronization circuits 370 and channels switch 330. In such embodiments, only demodulator 340 (implemented as software over DSP) may be configured to interface with the programmable device. In such embodiments, decoder 350 may be configured to output the blocks of user bits to demodulator 340, which may further be configured to pass these blocks to processor 360.

Demultiplexer 380 may be configured to receive a transport stream, which may be comprised of a plurality of frames immediately following one another, such as but not limited to MPEG frames (as per DVB-S and DVB-S2). This transport stream may include frames containing forward link signaling as defined in EN 301 790. Said forward link signaling may be further comprised of tables containing definitions of the return channel composition (e.g. a timeslot composition table (TCT), a frame composition table (FCT) and a super-frame composition table (SCT)) and of a terminal burst time plan table (TBTP), which may contain information regarding which timeslot is allocated to which terminal. Demultiplexer 380 may be configured to extract from the received transport stream at least the terminal burst time plan table (TBTP) and forward it to processor 360.

Processor 360 may be coupled with external peripherals for at least the purposes of storing software, storing parameters, storing received user information blocks and communicating with a host terminal. Said peripherals may include volatile memory, non-volatile memory and an Ethernet transceiver (PHY). In some embodiments, some or all of said peripherals may be embedded into processor 360. Regardless, for the purpose of this discussion processor 360 is considered to include said peripherals whether embedded into the processor chip itself or externally coupled with the processor chip.

Processor 360 may be configured to receive blocks of user bits, which may be formatted as return channel bursts according to EN 301 790 definitions, extract relevant ATM cells or MPEG frames out of said bursts, combine said ATM cells or MPEG frames into messages and send said messages via an Ethernet LAN interface to a host terminal. In some embodiments, the interest in an extracted frame may be determined based on a stream identifier, such as the VCI and VPI fields included in the ATM cell header or the PID field included in the MPEG frame header. Processor 360 may be configured to discard an extracted frame if it does not include an expected stream identifier. Furthermore, where a burst includes more than one frame, it is possible that any number of frames included within a burst will be either of interest or of non-interest.

Processor 360 may further be configured to receive from a host terminal via the LAN interface run-time software, parameters, information regarding the composition of the return channel (processor 360 may obtain this information also via demultiplexer 380), and other information items necessary for proper operation of mesh receiver 360. In addition, processor 360 may be configured to receive requests for telemetry, to reply these requests with the requested information, and to send events upon detecting a malfunction in any one or more components of mesh receiver 300.

Finally, synchronization & control circuits 370 may be configured to receive a reference PCR clock, e.g. at 27 MHz, and a frame synchronization signal, to drive a counter using said reference PCR clock and to load a predetermined value into said counter upon a transition of the frame synchronization signal. Furthermore, synchronization & control circuits 370 may be configured, including in run-time (e.g. by demodulator 340 where implemented as software running over DSP), to provide interrupts, symbol rate clocks and other control signals on a burst-by-burst basis to one or more other modules according to the values of said counter.

Furthermore, synchronization & control circuits 370 may also be configured to receive the external reference signal, which drives dual synthesizer 320 and measure its frequency using the received PCR clock signal, which may be much more accurate. Processor 360 may then be configured to read this measurement at least for the purpose of determining the frequency offset introduced by tuners 321 and 322.

In preferred embodiments, synchronization & control circuits 370 may be implemented using a programmable gate-array device (e.g. FPGA). Said programmable device may also include implementations of other modules, such as demultiplexer 380 and channels switch 330 together with its associated filters. In such embodiments, said programmable device may be coupled with a memory device for at least the purpose of facilitating the implementation of said modules.

FIG. 4 shows a block diagram of a remote terminal, such as remote terminal 111 or remote terminal 113 of FIG. 1. A remote terminal may be configured to include an antenna (not shown), a low-noise block amplifier (LNB) that may be mounted on the antenna (not shown), a satellite transmitter (also sometimes referred to as block up converter (BUC)) that may be mounted on the antenna (not shown), and an indoor unit 400, which may be coupled to the antenna, and/or to the other components that may be mounted on the antenna, via appropriate cables.

Indoor unit 400 may further include a TDM receiver comprised of tuner 431, demodulator 432 and demultiplexer 433, a transmission channel comprised of modulator 441 and output power control hardware 442 (e.g. attenuators), synchronization circuits 420, one or more processors 410 coupled with volatile and/or non-volatile memory devices 411, one or more LAN interfaces 470 and a mesh receiver 300.

Indoor unit 400 is very similar to indoor unit 200 of FIG. 2 and differs from it by being configured to include mesh receiver 300 and the applicable interfaces of said mesh receiver with the other modules. Therefore, except for mesh receiver 300, the description of all other modules is similar to that given in reference to FIG. 2 as per the respective modules.

Again, in reference to FIG. 4, mesh receiver 300 may be integrated with indoor unit 400. Given the interfaces of mesh receiver 300 with indoor unit 400 and though several embodiments may be possible, in a preferred embodiment mesh receiver 300 may be implemented as a plug-in module, which may be plugged into a dedicated interface of indoor unit 400 (e.g. a back panel equipped with an expansion slot connector) and fitted inside the indoor unit's casing (e.g. within an expansion bay).

Furthermore, when configured to include mesh receiver 300, indoor unit 400 may be coupled with an antenna or with an LNB mounted on an antenna in a different way than in a regular remote terminal, which is not configured to include a mesh receiver. Instead of configuring tuner 431 to receive a signal from an antenna (like in the case of tuner 231 in FIG. 2), the antenna may be coupled with the first port of mesh receiver 300 (as described above in reference to FIG. 3). Signal splitter 310 of mesh receiver 300 (FIG. 3) may then be configured to output a copy of the input signal via a second port, which may then be (externally) coupled using a short cable to the input of tuner 431.

Furthermore, as signal splitter 310 of mesh receiver 300 may be configured to pass DC current and voltage from the mesh receiver's second port to its first port, any DC current and voltage provided by tuner 431 for at least the purpose of powering an LNB may be passed via mesh receiver 300 to such LNB. Furthermore, as DC power supply to an LNB arrives from tuner 431 and not from mesh receiver 300, reception of the forward link signal (via tuner 431) may be independent of the condition of mesh receiver 300, which at times may be powered off or otherwise non-functional. Therefore the remote terminal's primary function of communicating with the hub (such as hub 101 of FIG. 1) is unaffected by the condition of mesh receiver 300 and connectivity with and via the hub remains possible at all times (i.e. as long as the host terminal is logged on to the hub, e.g. as defined in EN 301 790).

Another aspect of this embodiment of the invention regards the ability of signal splitter 310 of mesh receiver 300 to provide high isolation between the mesh receiver's second port, now coupled with tuner 431, and the mesh receiver's tuners 321 and 322. The high isolation prevents signals, which may be leaking from tuner 431 (e.g. local oscillator of tuner 431), from becoming interfering signals at the input of tuners 321 and 322, and visa versa (i.e. preventing signals leaking from tuners 321 and 322 from interfering tuner 431 as well as interfering one another). As the required isolation is taken care of by mesh receiver 300, no additional considerations are required, either in tuner 431 or externally to the indoor unit's casing.

Additional aspects of this invention shown in FIG. 4 relate to coupling of interfaces of mesh receiver 300 to various signals within indoor unit 400. In a similar manner to the description of FIG. 2, demodulator 432 may be configured to extract PCR timestamps from the forward link transport stream and provide them to synchronization circuits 420 for at least the purposes of obtaining synchronization on the network's time base and reconstructing a PCR clock. Synchronization circuits 420 may be further configured to generate a Frame Sync signal at constant intervals. Said intervals may be configured as equal to one or more return channel super frame intervals. Indoor unit 400 may yet further be configured to couple the PCR clock and the Frame Sync inputs of mesh receiver 300 to the extracted PCR clock and the Frame Sync signal generated by synchronization circuits 420. Such coupling may then be used at least for the purpose of synchronizing mesh receiver 300 to the network's time base. With such synchronization established, mesh receiver 300, having knowledge of the return channel composition and the PCR clock value at the start of any super frame, may be configured to receive a burst at a given timeslot number within a given super frame.

Furthermore, indoor unit 400 may be configured to couple the transport stream input of mesh receiver 300 with the transport stream output of demodulator 432. Said coupling may then be used for at least the purpose of having mesh receiver 300 (specifically demultiplexer 380) independently extracting the terminal burst time plan table (TBTP) from the transport stream. Such independency may insure that information on expected bursts is not delayed in the host terminal for any reason (e.g. high throughput or load) and reaches mesh receiver 300 as soon as possible at all times. Thus processor 360 of mesh receive module 300 (FIG. 3) may have sufficient time for extracting the necessary information from said table and for configuring all other relevant components of mesh receiver 300 for receiving those bursts of interest. On the other hand, the host terminal may also be free of the need to process the terminal burst time plan table (TBTP) several tens of times per second, in real time, for the purpose of seeking assignments of interest for mesh reception. Thus the performance of the host terminal in all other aspects may be unaffected by the fact that it may be configured to include a mesh receiver.

In some embodiments, the transport stream coupling described above may also be used for the purpose of having mesh receiver 300 (specifically demultiplexer 380) independently extracting other forward link signaling tables from the transport stream, such as a timeslot composition table (TCT), a frame composition table (FCT) and a super frame composition table (SCT). Mesh receiver 300 may then use the extracted tables to obtain the necessary knowledge of the return link composition, without requiring such information to be provided by the host.

Furthermore (as described in reference to FIG. 2), tuner 431 may be configured to include a frequency down converter, e.g. for the purpose of converting the frequency of the forward channel signal from higher bands often used at outputs of LNB units (e.g. L-band) to either IF, near base-band or base-band frequencies often expected and used by demodulators. Down conversion often requires use of a local oscillator signal, which may be configurable in run-time for at least the purpose of allowing a remote terminal to tune on a forward link signal at any frequency within a predefined range, as per the implementation of the satellite communication network (e.g. network 100 of FIG. 1). Said local oscillator may be generated by a synthesizer, which may be configured to include a reference signal, e.g. at 27 MHz.

Indoor unit 400 may be configured to couple the reference input of mesh receiver 300 with a reference signal of a synthesizer, which may be part of tuner 431. Said coupling may then be used at least for the purpose of having identical frequency offset ratios (or relative frequency errors, e.g. in PPM) for both the synthesizer of tuner 431 and the synthesizers of dual synthesizer 320, which may drive tuners 321 and 322 of mesh receiver 300. Therefore, the frequency error of a signal received via an LNB and then tuner 431 would be identical to that of the same signal received via the same LNB and either tuner 321 or tuner 322 of mesh receiver 300. As demodulator 432 may be configured to measure the frequency at which the forward link signal is received, processor 360 of mesh receiver 300 may be configured to use such measurement in order to calculate the required configuration of dual synthesizer 320 for receiving return link signals at demodulator 340 (almost) without any frequency offset.

Finally, indoor unit 400 may be configured to couple the LAN interface of mesh receiver 300 with one of the LAN interfaces 470. Said coupling may then be used by both indoor unit 400 (specifically processor 410) and mesh receiver 300 (specifically processor 360) for exchanging various information, such as but not limited to run-time software, parameters, return channel composition information, synchronization information, frequency offset measurements, telemetry requests and responses, events and so on. In addition, said coupling may also be used for transferring the received messages or packets from mesh receiver 300 to processor 410 at least for the purpose of further processing and routing as necessary.

FIG. 5 shows a block diagram of a hub 500, which may be similar to hub 101 of FIG. 1. Hub 500 may be comprised of a hub antenna 510, a low noise amplifier and down converter 520, a high power transmitter and up converter 530, a forward link generation module 540, one or more return channel receivers 550 and one or more processing units 560 (e.g. computers, personal computers, work stations or any one or more other processing devices, which may be configured to include the hardware and software necessary for performing at least the required tasks), where at least one of these processing units functions (either solely or also) as a network management system (NMS).

Low noise amplifier and down converter 520 may be configured to amplify signals received from the satellite via antenna 510 and change their frequencies from satellite frequencies (e.g. in Ku-band, C-band, Ka-band, etc) to lower frequencies (e.g. in L-band or IF), which may be better suited for further processing by return channel receivers 550. High power transmitter and up converter 530 may be configured to receive a modulated signal from forward link generation module 540 in relatively low frequency (e.g. in L-band or IF), change its frequency to a satellite frequency (e.g. in Ku-band, C-band, Ka-band, etc) and to significantly amplify it for the purpose of transmitting it towards a satellite via antenna 510.

Forward link generation module 540 may be further comprised of an encapsulation device 541 coupled with a modulator 542. Encapsulation device 541 may be configured to receive packets, such as IP packets, to encapsulate them, e.g. into MPEG frames and/or DVB-S2 baseband frames, and to output the resulting transport stream toward modulator 542. Modulator 542 may be configured to receive a transport stream, e.g. as MPEG frames or as DVB-S2 baseband frames, to receive modulation and coding information coupled with said baseband frames, and to generate a forward link signal compatible with EN 301 790 (e.g. DVB-S or DVB-S2). In addition, modulator 542 may be further configured to insert PCR timestamp frames into the transport stream and/or to re-stamp already existing PCR timestamp frames, which encapsulation device 541 may be configured to insert into the transport stream. For that purpose, i.e. PCR time-stamping, modulator 542 may be configured to include a highly accurate frequency source or to receive a highly accurate reference clock signal from an external source, such as a highly stabilized oscillator, an atomic clock, a GPS receiver or other. In some embodiments, encapsulation device 541 and modulator 542 may be integrated into a single device, which may be configured to perform the above described functions.

A return channel receiver 550 may be further comprised of tuner 551, one or more return link demodulators 552, one or more decoders 553, and a processor 554. Tuner 551 may be configured to tune on one or more channels within a predetermined bandwidth and to provide the received channels to demodulators 552 at either IF, near base-band or base-band frequencies. Return link demodulator 552 may be configured to receive a return link channel at either IF, near base-band or base-band frequency, to demodulate the signal as per the applicable modulation technique (e.g. QPSK, 8PSK, etc) and to forward blocks of coded bits to decoder 553. Decoders 553 may be configured to receive a block of coded bits, to decode said block of coded bits according to the applicable coding rate, and forward blocks of user bits to processor 554. Processor 554 may be configured to at least receive return channels assignment (frames), to receive frame composition and timeslot composition information for the assigned channels (frames), to control all other components for at least the purpose of facilitating the reception of return link bursts, and to send the received information, e.g. over a LAN interface, to one or more of the hub processing units 560.

In addition, a return channel receiver 550 may further be configured to include a down converter circuit 556, a forward link demodulator 557 (e.g. similar to demodulator 232 of indoor unit 200 of FIG. 2) coupled with down converter circuit 556, and synchronization circuits 558 coupled with forward link demodulator 557. The additional components (556 to 558) and processor 560 may be configured for at least extracting PCR timestamps from the forward link transport stream, obtaining synchronization on the network's time base and reconstructing an accurate local clock at the rate of the original clock used for generating the PCR timestamps.

FIG. 6 shows the same satellite-based communication network 100 of FIG. 1, including central hub 101, which may be similar to hub 500 of FIG. 5, satellite 102 and plurality of remote terminals 111 to 113. Hub 101 and remote terminals 111 to 113 may be configured to transmit data to and receive data via satellite 102 in accordance with EN 301 790 (DVB-RCS). Hub 101 may be further configured to transmit (over the forward link) frames containing timestamps, which are also referred to as PCR timestamps. Said timestamps may be of a network clock reference (NCR), where said clock reference is driven by a highly accurate clock source (as described in reference to modulator 542 of FIG. 5). As described above, these timestamps may be used both by remote terminals 111 to 113 and by the receivers of hub 101 (return channel receivers 550 of FIG. 5) in order to obtain synchronization on the network's time base and for generating an accurate local clock running at the rate of the original reference clock. As all network components lock their locally generated PCR clocks on a single reference (i.e. that which hub 101 transmits as timestamps), all PCR clocks run at exactly the same rate, though not necessarily showing the same value at the same time, as shown herein.

FIG. 6 further shows the PCR clock value at each of the system's components at a given point in time. Though satellite 102 may not have a PCR counter element in a physical manner, it should be appreciated that a reference to such counter is still valid, whereby if satellite 102 were to have such a counter, it would have shown the same value included in a PCR timestamp frame as that particular frame is received at satellite 102.

Again in reference to FIG. 6, all PCR clock values are referenced to T, which is the PCR clock value at satellite 102 at the moment of reference. As each earth station may be located at a different distance from satellite 102, the propagation interval for each station may be different. The propagation delay (in PCR clock units) for hub 101 is marked as DH and for remote terminals 111, 112 and 113 as $D_R1$, $D_R2$ and $D_R3$ respectively.

As PCR timestamp T reaches satellite 102, the PCR clock value of satellite 102 becomes T. As it would take an additional interval of DH for the same timestamp to reach return channel receivers 550 of hub 101 (FIG. 5), the local PCR clock of return channel receivers 550 is running late in reference to the PCR clock of satellite 102 by exactly DH. Therefore the local PCR clock of return channel receivers 550 shows the value of T−DH as the PCR clock value of satellite 102 becomes T. In a similar way, the local PCR clocks of remote terminals 111 to 113 at the same moment show the values T−DR1, T−DR2 and T−DR3 respectively. Furthermore, by the time PCR timestamp T reaches satellite 102 (i.e. the PCR clock value of satellite 102 is T), the PCR clock value at forward link generation module 540 of hub 101 (of FIG. 5) progresses by additional DH units and therefore shows the value of T+DH.

Furthermore, hub 101 and remote terminals 111 to 113 may be configured to regard any timestamps included in forward link signaling, such as but not limited to super-frame start time (which may be included in a super-frame composition table (SCT) such as defined by EN 301 790), as referring to the local PCR counter of satellite 102. Therefore, a remote terminal assigned a timeslot, the start time of which is PCR clock value T, may be configured to transmit a burst over said assigned timeslot when the local PCR counter of said remote terminal shows the value of T−2DR, where DR is the propagation delay of said remote terminal. Since the remote terminal's local PCR clock runs behind the satellite's PCR clock by a $D_R$ interval, the burst may be transmitted when the satellite's PCR clock shows the value of T−$D_R$, and since it takes the burst an additional $D_R$ interval to reach the satellite, the burst may be received at the satellite when the satellite's local PCR clock shows the value T, as intended.

Furthermore, the forward link signal (and therefore the PCR timestamps) and return link signals (and therefore transmitted bursts) are subjected to the same propagation delay for any given earth station. Therefore a burst transmitted at a timeslot of timestamp T, as described above, arrives at any receiver, be it a return channel receiver 550 (FIG. 5) at hub 101 or a mesh receiver 300 (FIG. 3) at a remote terminal such as 111 or 113, exactly when the local PCR clock at that receiver shows the value T.

As described above, return channel receivers 550 (FIG. 5) may be configured to reconstruct a local PCR clock from a received forward link signal, and mesh receive module 300 (FIG. 3 and FIG. 4) may be configured to receive a PCR clock from a host terminal, which may be configured to reconstruct it in a similar manner as return channel receivers 550. Therefore, in order to independently follow the return channel composition, synchronize on transmitted bursts and process them as described above, each receiver requires knowledge of the PCR clock value at a given moment in time (i.e. the network's time base). While a return channel receiver 550 may extract such information directly from the transport stream using demodulator 557 (in the same way described in reference to demodulator 232 of indoor unit 200 of FIG. 2), mesh receiver 300 may not be configurable of using the same mechanism, as said PCR timestamp frames may not exist in the transport stream provided by demodulator 432 (FIG. 4) or suffer (inconsistent) delay if such frames do exist A remote terminal, such as 111 or 113, which may be configured to include a mesh receiver 300, may also be configured to generate a Frame Sync signal (via synchronization circuits 420) towards mesh receiver 300, as described above and shown in FIG. 4. Said Frame Sync signal may be generated at constant intervals, which may be configured as equal to one or more return channel super frame intervals. Furthermore, based on the timestamps extracted from the forward link and the value of the local PCR clock at any given time, the host terminal may be configured to calculate (either in software or hardware) the expected local PCR clock value at the next significant edge of said Frame Sync signal, and to send said expected PCR clock value to mesh receiver 300 via LAN connectivity as shown in FIG. 4. Mesh receiver 300 may be configured to receive such PCR clock information over its LAN interface, load the received expected PCR clock value into synchronization & control circuits 370 (FIG. 3) and then load said value into its local PCR counter using the significant edge of the Frame Sync signal. Once so configured, mesh receiver 300 acquires the network's time base and may follow the return channel composition, synchronize on transmitted bursts and process them as described above.

In some embodiments, mesh receiver 300 and a host terminal may further be configured to repeat the above described mechanism either for every significant edge of the Frame Sync signal or for one in every predetermined number of such edges. Furthermore, upon loading a new value into the counter, mesh receiver 300 may compare said new value with the current value of its local PCR counter. If the difference between the two values is larger than a predefined threshold (e.g. 1) mesh receiver 300 may alert the host terminal (e.g. by sending an event packet over the LAN interface) that a synchronization problem may exist. In some embodiments, mesh receiver 300 may be configured to perform said comparison on every significant edge of the Frame Sync signal, where the value for comparison is either received from the host terminal or computed by mesh receiver 300 based on knowledge of the previous comparison value, the Frame Sync signal interval and the PCR clock rate.

Another aspect of this invention relates to frequency synchronization of mesh receiver 300 to a satellite-based communication network, such as network 100 of FIG. 1. In order to receive a return channel signal, a mesh receiver 300 has to be synchronized with transmitting remote terminals not only in time but also in frequency. Such synchronization may be initially acquired and then maintained over time. Some embodiments may also include a method for detecting loss of frequency synchronization and repeating the initial acquisition method thereafter.

Mesh implementation in said satellite-based communication system, such as network 100 of FIG. 1, may be intended as an overlay. Therefore it is only logical and even advantageous in some aspects (e.g. mesh multicasting) that mesh receiver 300 adjusts its reception frequency to match the transmission frequency of any other remote terminal rather than the other way around (i.e. for each remote terminal to adjust its transmission frequency according to a frequency offset of a possible receiver).

The above approach is further justified when considering that each remote terminal, as part of its regular operation according to EN 301 790, may already have its transmission frequency aligned with remote channel receivers 550 at the hub. Return channel receivers 550 of hub 101 may be configured to measure the frequency offset of received return channel signals. Hub 101 may be further configured to calculate frequency correction information on the basis of said measurements and to send said frequency corrections to remote terminals, such as remote terminals 111 to 113 (e.g. using a correction message table (CMT) as defined in EN 301 790). Return channel receivers 550 may be configured to perform said measurements using a reference signal, which may be derived from the reference signal driving the PCR counter, or another independent, yet sufficiently accurate (e.g. 0.1 PPM or better) reference signal.

Therefore, as all remote terminals may already be aligned to a certain reference (e.g. the one that may be used by return channel receivers 550), a mesh receiver 300 may be configured to align with any one of these remote terminals in order to acquire frequency synchronization with all remote terminals of said satellite-based communication network.

As described above in reference to FIG. 2 and FIG. 4, demodulator 432 may be configured to measure the frequency of the received forward link signal, e.g. while using the accurate reconstructed PCR clock as reference. Any measured offset from the nominal frequency is the sum of all offsets introduced by any one or more components comprising the forward link path, including modulator 542 ($\Delta F_{MOD}$), transmitter & up converter 530 ($\Delta F_{UC}$), satellite 102 ($\Delta F_{SAT}$), an LNB device coupled to the remote terminal's antenna ($\Delta F_{LNB}$) and tuner 431 ($\Delta F_{T431}$). Therefore, the measured frequency offset of the forward signal ($\Delta F_{FS}$) is:

$$\Delta F_{FS} = \Delta F_{MOD} + \Delta F_{UC} + \Delta F_{SAT} + \Delta F_{LNB} + \Delta F_{T431} \quad \text{(Eq. 1)}$$

Considering a signal transmitted by a remote terminal already frequency aligned with return channel receivers 550. The signal may then travel via several components affecting the signal's total frequency offset, as such may be measured by demodulator 340 of mesh receiver 300. Included in these components are satellite 102 ($\Delta F_{SAT}$), an LNB device coupled to the remote terminal's antenna ($\Delta F_{LNB}$) and tuners 321 and 322 ($\Delta F_{T32x}$), which have the same frequency offset at any given frequency (as described in reference to FIG. 3). In addition, if return channel receivers 550 measure the frequency of received return channel signals using an independent reference signal (as described above), an additional small offset ($\Delta F_{REF}$) may also exist. Therefore, the frequency offset of a return link signal ($\Delta F_{RCS}$), as measured by demodulator 340 of mesh receiver 300, is:

$$\Delta F_{RCS} = \Delta F_{SAT} + \Delta F_{LNB} + \Delta F_{T32x} + \Delta F_{REF} \quad \text{(Eq. 2)}$$

However, both the forward link signal and the return channel signals travel via satellite 102 and the LNB device coupled with the remote terminal's antenna. Therefore satellite 102 and the LNB device apply the same offsets both to the forward signal and to return channel signals. In addition, as described above, tuner 431 of the indoor unit and tuners 321 and 322 of mesh receiver 300 may be configured to share the same reference signal and therefore have the same frequency offset ratio. Thus, for any given frequency, $\Delta F_{T431}$ is equal to $\Delta F_{T32x}$. Therefore (integrating Eq. 2 into Eq. 1), the frequency offset of the forward signal may be expressed as follows:

$$\Delta F_{FS} = \Delta F_{RCS} - \Delta F_{REF} + \Delta F_{MOD} + \Delta F_{UC} \quad \text{(Eq. 3)}$$

Except for the $\Delta F_{RCS}$ factor, the frequency offset introduced by up converter 530 ($\Delta F_{UC}$) is the most dominant of all the remaining factors, primarily because the affected signals are at high frequency (such as in Ku-band or Ka-band). This frequency offset may be significantly greater than the frequency offset, which may be allowed by demodulator 340 of mesh receiver 300. However, like modulator 542 and return channel receivers 550, up converter 530 may also be configured to use an accurate reference signal, which may also exhibit slow aging. Therefore the combined frequency offset ($\Delta F_{HUB}$) that may be introduced by up converter 530 ($\Delta F_{UC}$), modulator 542 ($\Delta F_{MOD}$) and return channel receivers 550 (indirectly) may be almost constant and with a very slow change rate (i.e. it may be weeks or months until a significant change is accumulated).

Therefore, the frequency offset of a return channel signal can be determined from the measured frequency offset of the forward signal if the almost constant offset introduced by several hub components is known (integrating the following Eq. 4 into Eq. 3):

$$\Delta F_{HUB} = \Delta F_{MOD} + \Delta F_{UC} - \Delta F_{REF} \quad \text{(Eq. 4)}$$

$$\Delta F_{RCS} = \Delta F_{FS} - \Delta F_{HUB} \quad \text{(Eq. 5)}$$

FIG. 7 shows a flow chart describing a frequency synchronization acquisition algorithm for mesh receiver 300. This algorithm may be executed upon a host terminal and/or its included mesh receiver 300 determining that no information regarding $\Delta F_{HUB}$ is available. Such condition may exist upon installation of mesh receiver 300, either as part of a newly installed remote terminal or in an already installed remote terminal. Furthermore, this algorithm may also be executed upon a host terminal and/or its included mesh receiver 300 determining that any available information regarding $\Delta F_{HUB}$ is outdated and/or significantly inaccurate and therefore irrelevant and/or unusable. Such condition may exit if mesh connectivity is not or could not be attempted for weeks or months.

In step 701, a first host terminal, configured to include a mesh receiver 300, may send a message to hub 101 (e.g. using the Connection Control Protocol (C2P) or an extension of it) and request to set up unidirectional mesh connectivity with a second remote terminal (which may or may not be configured to include a mesh receiver), where the first remote terminal is the receiving party of said mesh connectivity. Said request may not specify which remote terminal is the second remote terminal, hence the second remote terminal may be any remote terminal currently logged on into the satellite network (including said first terminal), which may be configured to transmit a strong enough signal that may be received by mesh receiver 300 of the first remote terminal. In addition, said message may also include a capacity request (e.g. a rate-based capacity request). In some embodiments, one or more remote terminals may be designated to be used in synchronization sequences of mesh receivers. In such embodiments, the connection setup request may specify one of those one or more designated remote terminals as a second remote terminal to be used as the transmitting party of said mesh connectivity.

Hub 101 may be configured to select a second remote terminal in various ways upon receiving a request as described above, i.e. where a second remote terminal is not specified. In some embodiments, the selected second remote terminal may be the one capable of transmitting the strongest signal at the time the request is processed by hub 101. Once a second remote terminal is selected, hub 101 may set up the connection by sending one or more appropriate messages (e.g. using C2P or an extension of it) to both first and second remote terminals. Furthermore, hub 101 may also start allocating timeslots for this connection, as per the capacity request that may be included in the initial request message sent by the first remote terminal. These timeslots may be allocated on one or more return channels, as per the hub's discretion. Hub 101 may then use forward channel signaling (i.e. a terminal burst time plan table) in order to inform the second remote terminal of the timeslots allocated to it for transmission on said unidirectional mesh connection. In order to achieve that, hub 101 may be configured to use one or more information elements and/or descriptors of any forward channel signaling table in a manner which extends the definitions of EN 301 790.

In step 702, first remote terminal may be configured to obtain a measurement or a reading of the forward link signal's frequency offset ($\Delta F_{FS}$) from demodulator 432 and to pass it on to its included mesh receiver 300 (via their coupled LAN interfaces). As described in reference to FIG. 3 and FIG. 4, mesh receiver 300 may be configured to measure the frequency of the reference signal driving tuners 321 and 322, which may also be the reference signal which drives the down converter of tuner 431. Knowing the current frequency of the local oscillator within tuner 431 (in some embodiments, this information may be passed on to mesh receiver 300 together with the frequency offset measurement) and using the measurement of the reference signal driving said local oscillator, as described above, processor 360 of mesh receiver 300 may calculate the frequency offset of tuner 431 ($\Delta F_{T431}$).

On the other hand (integrating Eq. 6, which is based on Eq. 1, into Eq. 2):

$$\Delta F_{LNB} = \Delta F_{FS} - \Delta F_{T431} - (\Delta F_{HUB} + \Delta F_{REF} + \Delta F_{SAT}) \qquad \text{(Eq. 6)}$$

$$\Delta F_{RCS} = \Delta F_{FS} - \Delta F_{T431} + \Delta F_{T32x} - \Delta F_{HUB} \qquad \text{(Eq. 7)}$$

Mesh receiver 300 may be configured to initially assume a predefined value for the frequency offset introduced into the forward link signal by the various hub components ($\Delta F_{HUB}$). In some embodiments, this initial value may be 0. Mesh receiver 300 may then be configured to set tuners 321 and 322 at an offset of $\Delta F_{RCS}$ from the nominal frequency of each return channel, where $\Delta F_{RCS}$ may be calculated using Eq. 7 above, as all the factors on the right side of Eq. 7 may be known to mesh receiver 300 or may be calculated as described above.

Again in reference to FIG. 7, in step 703, the second remote terminal, i.e. the one that may be selected by hub 101 as the transmitting side for said unidirectional mesh connectivity, may be configured to transmit information bursts on all timeslots allocated for the said unidirectional mesh connection. In some embodiments, all said information bursts may contain predetermined and constant content. Furthermore, mesh receiver 300 of the first remote terminal associated with said unidirectional mesh connection, may be configured to receive a terminal burst time plan table (TBTP) that may be transmitted by hub 101 (as described in reference to FIG. 3 and FIG. 4), to further identify allocations made for said unidirectional mesh connection (e.g. using one or more identifiers, which may be included in the signaling messages sent by hub 101 to the first remote terminal in step 701), and to configure tuners 321 and 322 as described above (in reference to step 702) to the appropriate frequencies at the appropriate times (as per the timing synchronization mechanism already described in reference to FIG. 6), at least for the purpose of receiving said bursts transmitted by the second remote terminal on said allocated timeslots.

Initially, the bursts transmitted by the second remote terminal may not be received by mesh receiver 300 of the first remote terminal. $\Delta F_{HUB}$ may not be equal to the initially assumed predetermined value and may be greater than the offset tolerable by demodulator 340 of mesh receiver 300. Since the second remote terminal may transmit on every allocated timeslot, mesh receiver 300 of the first remote terminal may be configured to deduce that the chosen $\Delta F_{HUB}$ is wrong after failing to receive any of the transmitted bursts over a predefined number of allocated timeslots. Mesh receiver 300 may further be configured to assume a different value for $\Delta F_{HUB}$ within a predefined range (i.e. the $\Delta F_{HUB}$ uncertainty range) and repeat the above described procedure using the newly assumed value of $\Delta F_{HUB}$. It should be appreciated by anyone skilled in the art that there could be several algorithms for determining new values for $\Delta F_{HUB}$ and that each and every one of them is consistent with the aspects of this invention.

Step 703 may be concluded once mesh receiver 300 of the first remote terminal succeeds in receiving one or more bursts transmitted by the second remote terminal. In some embodiments, if such reception does not occur within a predetermined interval or within a predetermined and sufficient number of iterations using different values for $\Delta F_{HUB}$, mesh receiver 300 may terminate the algorithm while sending an event to the host terminal that frequency acquisition has failed. Such event may then be further delivered to the network management system at hub 101 for at least the purpose of notifying a network operator of said malfunction.

In step 704, mesh receiver 300 of first remote terminal, after succeeding in receiving bursts transmitted by the second remote terminal, may be configured to fine tune (i.e. slightly modify) the value of $\Delta F_{HUB}$, so that return channel signals are received at the center of a frequency window supported by demodulator 340 of mesh receiver 300, or at any other desired position within said frequency window. Once reception at the desired position within said frequency window is achieved, mesh receiver 300 may determine the exact value of $\Delta F_{HUB}$ (using Eq. 7 where all other factors are known from the measurements described above).

In step 705, mesh receiver 300 of first remote terminal, and/or the host terminal, may be configured to record the value of $\Delta F_{HUB}$ found in step 704. Said recording may involve the writing of this value into one or more non-volatile memory devices coupled either with processor 360 of mesh receiver 300 or with processor 410 of the host terminal (indoor unit 400 of FIG. 4). Along with the value of $\Delta F_{HUB}$, mesh receiver 300 and/or the host terminal may be configured to record date information or any other real-time-clock information that may be later used to determine how old (and therefore how accurate) the recorded $\Delta F_{HUB}$ information is.

In step 706, the first remote terminal may be configured to send a message to hub 101 (e.g. using C2P or an extension of it) and request to release the said unidirectional mesh connection. Upon receiving this request, hub 101 may send one or more appropriate messages (e.g. using C2P or an extension of it) to both first and second remote terminals and close the said connection. Furthermore, hub 101 may stop allocating timeslots for this connection.

During normal operation, the first remote terminal and its included mesh receiver 300 may be configured to perform the procedures described herein, at least for the purpose of maintaining frequency synchronization on return channels. These procedures may achieve such maintenance without repeating the algorithm described in FIG. 7 and without using any bandwidth specifically for this purpose. Any bandwidth used by these procedures may be initially used for at least the purpose of exchanging user information between remote terminals using mesh connectivity.

The first remote terminal may repeatedly inform its included mesh receiver 300 of frequency offset readings taken from demodulator 432 ($\Delta F_{FS}$), as described above in reference to step 702. The periodicity at which such readings may be reported to mesh receiver 300 may depend on the frequency stability of the least stable component in the reception chain, which in many embodiments may be the LNB. Such readings may be reported to mesh receiver 300 at all times, regardless of whether mesh connectivity reception is in progress or not.

In addition, during normal operation, mesh receiver 300 may be configured to repeatedly measure the reference signal driving tuners 321 and 322, as described above in reference to step 702. Such measurement and the resulting calculation of $\Delta F_{T431}$ may be done at all times, regardless of whether mesh connectivity reception is in progress or not.

Furthermore, during normal operation, the first remote terminal may be required to receive bursts transmitted by other remote terminals, for at least the purpose of receiving user information. Mesh receiver 300 of said first remote terminal may be configured to use Eq. 7 for calculating the necessary configuration of tuners 321 and 322 using the latest reading of $\Delta F_{FS}$, the latest frequency measurement of the tuners' reference signal, the latest calculation of $\Delta F_{T431}$ and the last known value of $\Delta F_{HUB}$, as described above. Mesh receiver 300 (specifically demodulator 340) may further be configured to measure the actual frequency offset of each received burst (regardless of a connection or a session this burst may be associated with and/or of symbol rate, modulation and coding of each such burst) and to further process these measurements (e.g. using a moving average function over a predetermined number of samples, an exponential averaging function or any other suitable method), at least for the purposes of minimizing measurement errors and/or preventing any single relatively large measured offset to significantly influence the measured frequency offset.

Over time, mesh receiver 300 may determine that the measured frequency offset of received bursts, relative to the center of the frequency window supported by demodulator 340 or relative to any other desired position within said frequency window, is no longer 0 as it was immediately upon completion of step 704. Mesh receiver 300, upon determining that said frequency offset exceeds a predefined threshold (which may exceed any expected measurement error), may be configured to repeat steps 704 and 705 described above, i.e. to recalculate the value of $\Delta F_{HUB}$ and to record the newly calculated value over the previous value, hence deleting the previous value of $\Delta F_{HUB}$.

Furthermore, mesh receiver 300 may use the procedure described herein at least for the purpose of preventing the acquisition algorithm described in FIG. 7 from being unnecessarily activated. During normal operation, upon obtaining frequency offset measurements from sufficient number of bursts received over an interval not exceeding a predefined length, and processing them as described above, mesh receiver 300 may be configured to examine the date attached to the recorded value of $\Delta F_{HUB}$, as described in reference to step 705. If the recorded value of $\Delta F_{HUB}$ is older than a predefined threshold, mesh receiver 300 may use the current frequency offset measurement in order to update the recorded value of $\Delta F_{HUB}$ (as described in steps 704 and 705) and attach a current date to the newly recorded value. Mesh receiver 300 may be configured to follow the above-described procedure even if the difference between the current measurement of $\Delta F_{HUB}$ and the recorded value of $\Delta F_{HUB}$ does not exceed the threshold, which requires updating the recorded value of $\Delta F_{HUB}$.

Again, in reference to FIG. 7, the above described frequency synchronization methods (both the acquisition part and the maintenance part) are based on measuring the frequency offset of the forward link signal ($\Delta F_{FS}$) and on the assumption that any significant change in that measurement is likely to result from changes in the offsets of components, which also affect the frequency offset of return channels, e.g. the LNB device and/or the reference signal that drives tuners 431, 321 and 322. However, as shown in Eq. 1 above, a change in $\Delta F_{FS}$ may also result from a change in the frequency offsets introduced by some hub components, such as up converter 530 ($\Delta F_{UC}$) and/or modulator 542 ($\Delta F_{MOD}$), where such change does not affect the frequency offset of return channel signals ($\Delta F_{RCS}$). When such a change occurs (e.g. when redundant up converter and/or modulator units, which are not synchronized in frequency with the main units, take over the main units) and the change is greater than the frequency window supported by demodulator 340 of mesh receiver 300, mesh receiver 300 may lose frequency synchronization on the return channels.

A remote terminal and/or its included mesh receiver 300 may be configured to monitor established mesh connectivity sessions, where the remote terminal is expected to receive bursts transmitted by one or more other remote terminals. If one or more such sessions were allocated timeslots for transmission by any of the other remote terminals and afterwards terminated without any burst received, the remote terminal and/or its included mesh receiver 300 may be configured to interpret such event as an indication for a synchronization loss (either frequency synchronization or synchronization on any other parameter) and thereafter repeat the frequency synchronization acquisition algorithm described in FIG. 7. In some embodiments, other criteria for determining synchronization loss may be used, including but not limited to receiving bursts with uncorrectable errors at a number or at a ratio exceeding a predefined threshold.

Another aspect of this invention relates to dynamically determining the difference in link conditions between the hub down-link and the down-link of each remote terminal equipped with a mesh receiver. By determining this deference in real time, a satellite-based communication network, such as network 100 of FIG. 1, may be configured to support adaptability over mesh connectivity as well as towards the hub. In other words, any remote terminal transmitting over a mesh connection towards another remote terminal may be configured to adjust its transmission power to fit the other transmission parameters (i.e. symbol rate, modulation and coding) and the link condition of the receiving remote terminal. Furthermore, hub 101 may be configured to use such measurements during any bandwidth allocation process, at least for the purposes of selecting the most efficient symbol rate, modulation and coding option supportable by each mesh connection and for insuring that the allocated bandwidth can be successfully utilized (i.e. that the receiver will indeed be capable of receiving any transmission made over these allocations).

In a satellite-based communication network, such as network 100 of FIG. 1, remote terminals 111 to 113 and hub 101 may be configured to use one or more methods for transmission power regulating, regardless of mesh connectivity.

Hub 101 may be configured to include an up-link power control (ULPC) mechanism for at least the purpose of compensating for changes in link conditions between hub 101 and satellite 102. Up-link power control may be based on receiving at the hub's site either a satellite beacon signal or the transmitted forward link signal (where satellite 102 does not transmit a beacon signal), detecting changes in reception level of the received signal, and adjusting the transmission level of the forward link signal for at least the purpose of having the forward link signal received at constant power level at satellite 102 (and consequently at remote terminals 111 to 113 assuming constant link conditions at their respective down links). In addition, remote terminals 111 to 113 may be configured to measure the reception level of the forward signal and to periodically report these measurements to the hub. In some embodiments, forward link reception level information may be included in link maintenance bursts (such as SYNC bursts as defined in EN 301 790), and used by hub 101 for at least the purpose of supporting adaptive coding and modulation over the forward link.

Furthermore, hub 101 may be configured to measure the reception level of received return link signals and to provide these measurements over the forward link, e.g. using a correction message table (CMT) as defined in EN 301 790. Remote terminals may be configured to receive such measurements and to use output power control 242 of FIG. 2 to adjust their transmission power according to the received measurements and according to all other transmission parameters (i.e. symbol rate, modulation and coding).

Furthermore, a remote terminal, such as remote terminals 111 to 113, may be configured to determine its maximal transmission power. In preferred embodiments, the remote terminal may be configured to use a linear satellite transmitter (BUC) therefore the maximal transmission power level may correspond to the 1 dB compression point of such satellite transmitter. In some embodiments, maximal transmission power (and the corresponding settings of output power control 242) may be determined as part of the remote terminal's installation procedure. In other embodiments, the remote terminal may be configured to occasionally measure the maximal transmission power. In some of these embodiments the remote terminal may by configured to gradually increase the transmission power level of certain maintenance bursts (e.g. SYNC bursts as defined by EN 301 790) and to use the reception level measurements provided by the hub for at least the purpose of calculating the point where the transmission gain decreases by 1 dB.

Regardless of the method selected for determining the remote terminal's maximal transmission power, once determined the remote terminal may use that information at least for the purpose of informing the hub of its maximal transmission capability, i.e. of the additional gain (e.g. in dB) it may apply to a signal transmitted at a minimal reference power level. In some embodiments, the minimal reference power level may be the transmission level required for transmitting the most robust signal (i.e. the signal requiring the minimal transmission power) in order for that signal to be received at hub 101 at a minimal reception level. Once informed of transmission capability of a given remote terminal, the hub may use this information during bandwidth allocation at least for the purpose of selecting efficient symbol rate, modulation and coding rate options that may be supported by the remote terminal and for insuring that any allocated bandwidth can be successfully utilized.

Furthermore, a satellite-based communication network, such as network 100 of FIG. 1, may be configured to dynamically determine a mesh factor for each remote terminal containing a mesh receiver 300, such as remote terminals 111 and 113. The mesh factor may represent the difference in link conditions and properties between the hub downlink and the receiving remote terminal's downlink. Considering that a signal has to be transmitted from a first remote terminal via the satellite towards the hub and received at par level, where par level may be defined as quasi-error-free level plus any predefined fade margin. Therefore, for at least the purpose of achieving reception at the same par level at a mesh receiver of a second remote terminal, at any given time the mesh factor for the second remote terminal may represent the additional gain needed when transmitting a signal of the same other properties (i.e. symbol rate, modulation and coding rate) from a first remote terminal via the satellite towards the second remote terminal.

In order to determine a mesh factor for each remote terminal equipped with a mesh receiver, a satellite-based communication network, such as network 100 of FIG. 1, may be configured to use a calibration method and a tracking method.

FIG. 8 shows a flow chart describing mesh factor calibration algorithm 800 for mesh receiver 300. This algorithm may be executed upon a host terminal and/or its included mesh receiver 300 determining that a mesh factor has not yet been calculated. Such condition may exist upon installation of mesh receiver 300, either as part of a newly installed remote terminal or in an already installed remote terminal.

In step 801, a first host terminal, configured to include a mesh receiver 300, may send a message to hub 101 (e.g. using the Connection Control Protocol (C2P) or an extension of it) and request to set up unidirectional mesh connectivity with a second remote terminal (which may or may not be configured to include a mesh receiver), where the first remote terminal is the receiving party of said mesh connectivity. Said request may not specify which remote terminal is the second remote terminal, hence the second remote terminal may be any remote terminal currently logged on into the satellite network (including said first terminal), which may be configured to transmit a strong enough signal that may be received by mesh receiver 300 of the first remote terminal. In addition, said message may also include a capacity request (e.g. a rate-based capacity request).

Hub 101 may be configured to select a second remote terminal in various ways upon receiving a request as described above, i.e. where a second remote terminal is not specified. In some embodiments, hub 101 may be configured to select a remote terminal with transmission capabilities either equal or exceeding a predetermined mesh factor figure. The predetermined mesh factor figure may exceed the expected clear sky mesh factor (which may be predetermined using link budget calculations) by a predetermined margin at least for the purpose of increasing the probability of success should the calibration attempt occur while link conditions are not optimal. Once a second remote terminal is selected, hub 101 may establish the connection by sending one or more appropriate messages (e.g. using C2P or an extension of it) to both first and second remote terminals. The message to the first remote terminal may further contain the predetermined mesh factor figure, at least for the purpose of calculating a reference mesh factor measurement, as further described herein. The message to the second remote terminal may further contain the predetermined mesh factor figure, at least for the purpose of having the second remote terminal transmitting at that predefined gain over that mesh connection.

Furthermore, hub 101 may also start allocating timeslots for this connection, as per the capacity request that may be included in the initial request message sent by the first remote terminal. These timeslots may be allocated on one or more return channels, as per the hub's discretion. Hub 101 may then use forward channel signaling (i.e. a terminal burst time plan table) in order to inform the second remote terminal of the timeslots allocated to it for transmission on said unidirectional mesh connection. In order to achieve that, hub 101 may be configured to use one or more information elements and/or descriptors of any return channel signaling table in a manner which extends the definitions of EN 301 790.

The second remote terminal, i.e. the one that may be selected by hub 101 as the transmitting side for said unidirectional mesh connectivity, may be configured to transmit information bursts on timeslots allocated to the said unidirectional mesh connectivity. In some embodiments, all said information bursts may contain predetermined and constant content. Furthermore, mesh receiver 300 of the first remote terminal associated with said unidirectional mesh connectivity, may be configured to receive a terminal burst time plan table (TBTP) that may be transmitted by hub 101 (as described in reference to FIG. 3 and FIG. 4) and to further identify allocations made to said unidirectional mesh connectivity (e.g. using one or more identifiers, which may be included in the signaling messages sent by hub 101 to the first remote terminal in step 801). Mesh receiver 300 may be further configured to configure tuners 321 and 322 to tune on bursts transmitted by the second remote terminal at the appropriate frequencies and times (as per the timing and frequency synchronization mechanisms already described in reference to FIG. 6 and FIG. 7), at least for the purpose of receiving said bursts transmitted by the second remote terminal on said allocated timeslots. Again in reference to FIG. 8, in step 802, for each received burst, mesh receiver 300 of the first remote terminal may measure the burst's reception level (e.g. C/N or ES/N0) and calculate its par margin by subtracting the par level required for receiving that burst (as per the burst's other parameters, such as modulation and coding rate) from the measured reception level. Step 802 may be completed once a predefined number of bursts have been correctly received.

In step 803, mesh receiver 300 of the first remote terminal may be configured to calculate a reference mesh factor figure. Mesh receiver 300 may apply a mathematical algorithm, such as but not limited to an averaging function, to the collection of par margin measurements obtained in step 802 and then subtract the result from the predetermined mesh factor figure, as provided to the first remote terminal in step 801.

In parallel to steps 802 and 803, the first remote terminal may be configured to obtain measurements or readings of the forward link signal's reception level from demodulator 432 and to pass them on to its included mesh receiver 300 (via their coupled LAN interfaces). In step 804, mesh receiver 300 may be configured to determine the forward link's reception level by applying a mathematical algorithm, such as but not limited to an averaging function, to a collection of said forward link reception level measurements received from the host terminal.

In step 805, mesh receiver 300 of first remote terminal, and/or the host terminal itself, may be configured to record a reference measurement. The reference measurement includes the reference mesh figure previously calculated in step 803 and the corresponding forward link reception level previously calculated in step 804. Said recording may involve writing the reference measurement values into one or more non-volatile memory devices coupled either with processor 360 of mesh receiver 300 or with processor 410 of the host terminal (indoor unit 400). Along with recording said reference measurement, mesh receiver 300 and/or the host terminal may be configured to record date information or any other real-time-clock information that may be later used to determine how old (and therefore how dependable) the recorded reference measurement is.

In step 806, the first remote terminal may be configured to send a message to hub 101 (e.g. using C2P or an extension of it) and request to release the unidirectional mesh connectivity. The release message may further include the values of the recorded reference measurement. Upon receiving this request, hub 101 may send one or more appropriate messages (e.g. using C2P or an extension of it) to both first and second remote terminals in order to close the connection, and stop allocating timeslots for this connection. Furthermore, hub 101 may store the reference measurement in association with the first remote terminal, at least for the purpose of using it as further described herein.

In some embodiments, a remote terminal may further report a reference measurement whenever the remote terminal logs on to hub 101. A remote terminal may skip algorithm 800 and report the already recorded reference measurement if the record is not too old as per the date recorded with the reference measurement in step 805.

In some further embodiments, where the predetermined mesh factor figure is constant, the first remote terminal may include in the reference measurement the par margin measurements average and the corresponding forward link reception level. Hub 101 may be configured to receive the par margin measurements average and calculate the reference mesh factor of the reference measurement.

During normal operation, hub 101 may be further configured to calculate an actual mesh factor (MFACT) for a remote terminal containing a mesh receiver 300 using the stored reference measurement for that remote terminal (forward link reception level ($FL_{REF}$) and a reference mesh factor ($MF_{REF}$)), and forward link reception level information ($FL_{CUR}$) that may be included in link maintenance bursts (such as SYNC bursts as defined in EN 301 790), which may be transmitted by that remote terminal, as previously described:

$$MF_{ACT} = MF_{REF} - (FL_{CUR} - FL_{REF})$$

Hub 101 may be configured to include an up-link power control mechanism, as previously described. Therefore changes in forward link reception level may be attributed to changes in the satellite link between satellite 102 and the applicable remote terminal. As link condition deteriorate the forward link reception level decreases and the actual mesh factor has to be equally increased in order to maintain reception at par level. As link conditions improve, forward link reception level increases and the actual mesh factor may be equally decreased, at least for the purposes of allowing use of more efficient and higher throughput channels and regulating the transmission power of other remote terminals over mesh connectivity as well as towards the hub.

Furthermore, hub 101 may be configured to notify remote terminals of actual mesh factors upon establishment of a mesh connection. Considering a first remote terminal, configured to include a mesh receiver 300 and a second remote terminal where the second remote terminal requests to establish mesh connectivity towards the first remote terminal. Upon receiving a connection establishment request, hub 101 may be configured to respond with appropriate connection establishment messages to both remote terminals. Hub 101 may be further configured to include the actual mesh factor of the first remote terminal in the message sent towards the second remote terminal. Where the second remote terminal is also configured to include a mesh receiver 300, hub 101 may further include the actual mesh factor of the second remote terminal in the message sent towards the first remote terminal.

Furthermore, as mesh factors of remote terminals may vary in time, including when mesh connections are already established, hub 101 may be further configured to transmit a table of mesh factors over the forward link for at least the purpose of allowing remote terminals transmitting over mesh connections to adjust their transmission gain to match the changes in mesh link conditions. Each record in the table may include at least a mesh factor figure and one or more identifiers, which may be sufficient to enable remote terminals to correctly identify the remote terminal to which the reported mesh factor relates to. In order to enable quick response, the table may be transmitted several times every second. In some embodiments, each transmitted instance of the table may include the mesh factor of each remote terminal configured to include a mesh receiver and listening on at least one active mesh connection. In other embodiments, a mesh factor of a remote terminal as described above may be included in one or more consecutive transmitted instances of the table only if the mesh factor of that terminal had changed by more than a predefined difference since the last time this mesh factor had been included in the table. Furthermore, a first remote terminal may be configured to receive a mesh factors table, determine whether any of the entries relates to a second remote terminal, with which the first remote terminal has an already open mesh connection where the first remote terminal is the transmitting party, and to adjust its transmission level over that connection according to the reported mesh factor.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. A terminal in a satellite communication system comprised of a central hub and a plurality of terminals, the terminal comprising:
   at least one Ethernet interface;
   a mesh receiver configured to receive multi-frequency time division multiple access (MF-TDMA) transmissions from other terminals in the satellite communication system;
   a time division multiplexing (TDM) receiver configured to receive transmissions from the central hub, said TDM receiver comprising a tuner, a demodulator and a demultiplexer;
   at least one processor coupled to volatile or non-volatile memory devices; and
   synchronization circuits,
   wherein the terminal is configured to:
      couple a reference clock input of the mesh receiver with a reconstructed reference clock (PCR) generated by the synchronization circuits;
      couple a frame synchronization input of the mesh receiver with a frame synchronization signal generated by the synchronization circuits;
      couple a transport stream input of the mesh receiver with a transport stream output of the TDM receiver's demodulator;
      couple an external reference signal input of the mesh receiver with a reference signal of the TDM receiver's tuner; and
      couple an Ethernet interface of the mesh receiver with an Ethernet interface of the terminal.

2. The terminal of claim 1, wherein the mesh receiver comprises:
   a signal splitter;
   two or more frequency synthesizers; and
   two or more configurable tuners, wherein each configurable tuner is configured to:
      receive a copy of an input signal from the signal splitter;
      receive a local oscillator signal from one frequency synthesizer;
      extract or filter a signal of interest from the copy of the input signal; and
      convert the extracted signal to a digitally sampled signal.

3. The terminal of claim 2, wherein the mesh receiver further comprises a channel switch and at least one demodulator, and wherein the channel switch is configured to:
   receive two or more digitally sampled signals from two or more tuners, wherein each signal is received over a different input;
   select one of the inputs on a per burst basis; and
   pass the digitally sampled signal from the selected input to at least one demodulator.

4. The terminal of claim 3, wherein the mesh receiver further comprises at least one decoder, and wherein said at least one demodulator included in the mesh receiver is configured to:
   receive information corresponding to expected bursts and their expected modulation types;
   demodulate each received burst according to the expected modulation type;
   forward blocks of demodulated coded bits to a decoder; and
   provide measurements for each received bursts, including but not limited to a frequency offset measurement and a reception level measurement.

5. The terminal of claim 4, wherein the mesh receiver further comprises at least one transport stream demultiplexer and at least one processor, and wherein the demultiplexer is configured to:
   receive a transport stream comprised of a plurality of frames following one another;
   extract at least a burst time plan table from the transport stream; and
   forward the extracted burst time plan table to a processor.

6. The terminal of claim 5, wherein the mesh receiver's processor is configured to:
   receive blocks of user bits from the at least one decoder;
   extract frames of interest from the blocks of user bits;
   assemble the extracted frames into packets or messages; and
   forward the packets or messages the terminal via said Ethernet interface.

7. The terminal of claim 1, wherein the mesh receiver comprises synchronization and control circuits configured to:
   receive a reference clock and a frame synchronization signal;
   drive a counter using the reference clock;
   load a predetermined value into the counter upon a transition of the frame synchronization signal; and provide interrupts, sample clocks and other control signals on a burst-by-burst basis to one or more other modules according to values of the counter.

8. The terminal of claim 1, wherein the synchronization circuits are configured to:
receive timestamps of a network clock reference;
reconstruct a reference clock (PCR) using said received timestamps;
provide signals for timing the terminal's transmissions so that these transmissions arrive at the satellite at their designated times; and
generate a frame synchronization signal for synchronizing the mesh receiver.

9. The terminal of claim 1, wherein the TDM receiver's tuner includes a configurable down converter configured to include a reference signal or to receive a reference signal for generating a local oscillator signal.

10. The terminal of claim 2, wherein the signal splitter included in said mesh receiver is configured to:
receive an input signal via a first port;
generate first and second copies of the input signal;
output the first copy of the input signal via a second port; and
split the second copy of the input signal into third and fourth copies of the input signal.

11. The terminal of claim 10, wherein the terminal is configured to couple with an antenna or with a low-noise block amplifier (LNB) mounted on an antenna, wherein:
the antenna or the LNB are coupled to said first port of said signal splitter;
the TDM receiver's tuner of the terminal is configured to couple to said second port of the signal splitter;
the TDM receiver's tuner is configured to provide direct current (DC) and voltage to the LNB; and
direct current (DC) and voltage are passed to the coupled LNB via said second and first ports of the signal splitter.

12. The terminal of claim 4, wherein the at least one decoder included in the mesh receiver is configured to:
receive blocks of coded bits;
receive information corresponding to coding rates of the blocks of coded bits on a per block basis; and
decode each block of coded bits according to the received coding rate information.

13. The terminal of claim 5, wherein the at least one processor of the mesh receiver is further coupled with external peripherals and is configured to perform one or more of:
storing software;
storing parameters;
storing received user information blocks; and
communicating with the terminal.

14. A method of synchronizing a mesh receiver in a remote terminal in a satellite communication system comprised of a central hub and plurality of remote terminals, comprising:
receiving, at the remote terminal, a transport stream containing clock timestamps;
reconstructing a reference clock (PCR) at the remote terminal using the clock timestamps in the received transport stream;
coupling the reconstructed reference clock to a first input of the mesh receiver;
generating, at the remote terminal, a frame synchronization signal distinct from the reconstructed reference clock, the frame synchronization signal having a series of significant edges;
coupling the frame synchronization signal to a second input of the mesh receiver;
calculating, at the remote terminal, a local reference clock (PCR) value corresponding to the timing of a next significant edge of the frame synchronization signal; and
sending a packet from the remote terminal over an Ethernet interface to the mesh receiver, wherein the packet includes a calculated reference clock value.

15. The method of claim 14, wherein the remote terminal is configured to send a packet containing a calculated reference clock value at least a predetermined interval prior to the occurrence of a corresponding next significant edge of the frame synchronization signal.

16. The method of claim 14, further comprising at the mesh receiver:
receiving a reference clock (PCR);
driving a local reference clock counter;
receiving a frame synchronization signal;
receiving a packet containing a reference clock value; and
loading the reference clock value into the local reference clock counter at the timing of the closest significant edge of the frame synchronization signal.

17. The method of claim 16, further comprising:
at the mesh receiver, upon loading the reference clock value into the local reference clock counter, comparing the clock reference value to be loaded with a current value of the clock reference counter; and
notifying the remote terminal if the difference between the two clock reference values exceeds a predefined threshold.

18. The method of claim 17, further comprising:
comparing, at the mesh receiver, the clock reference values at the timing of every significant edge of the frame synchronization signal,
wherein the clock value to be loaded is either received from the host terminal or calculated by the mesh receiver using a previous comparison value, knowledge of the frame synchronization signal interval, and the clock reference rate.

19. The method of claim 14, further comprising:
continuously sending, by the remote terminal, packets containing calculated reference clock values at regular intervals.

* * * * *